United States Patent
Nagashima et al.

(10) Patent No.: US 7,838,791 B2
(45) Date of Patent: Nov. 23, 2010

(54) METAL COATING REMOVING APPARATUS AND METAL COATING REMOVING METHOD

(75) Inventors: Takashi Nagashima, Kyoto (JP); Takao Hisazumi, Ibaraki (JP); Hidenori Akiyama, Kikuchi-gun (JP); Takao Namihira, Kumamoto (JP)

(73) Assignee: Panasonic Corporation, Osaka (JP)

( * ) Notice: Subject to any disclaimer, the term of this patent is extended or adjusted under 35 U.S.C. 154(b) by 1405 days.

(21) Appl. No.: 10/557,289

(22) PCT Filed: Oct. 29, 2004

(86) PCT No.: PCT/JP2004/016086
§ 371 (c)(1),
(2), (4) Date: Nov. 18, 2005

(87) PCT Pub. No.: WO2005/058570
PCT Pub. Date: Jun. 30, 2005

(65) Prior Publication Data
US 2007/0018158 A1    Jan. 25, 2007

(30) Foreign Application Priority Data
Oct. 31, 2003  (JP) .............................. 2003-372799
Apr. 5, 2004   (JP) .............................. 2004-111437

(51) Int. Cl.
 *B23H 1/00*     (2006.01)
(52) U.S. Cl. .................. 219/69.11; 219/69.15
(58) Field of Classification Search ............... 219/68, 219/69.1, 383, 384
See application file for complete search history.

(56) References Cited

U.S. PATENT DOCUMENTS

| | | | | |
|---|---|---|---|---|
| 3,538,308 A | * | 11/1970 | Schmidt | 219/384 |
| 4,425,496 A | * | 1/1984 | le Fur et al. | 219/68 |
| 4,501,947 A | * | 2/1985 | Kerlin | 219/68 |
| 4,665,293 A | * | 5/1987 | Crespin | 219/69.2 |
| 4,931,613 A | * | 6/1990 | Salsgiver et al. | 219/68 |
| 5,223,687 A | * | 6/1993 | Yuasa et al. | 219/68 |
| 5,842,650 A | | 12/1998 | Hofmann | |
| 2005/0029329 A1 | * | 2/2005 | Roberts et al. | 228/110.1 |
| 2008/0257867 A1 | * | 10/2008 | Malshe et al. | 219/69.14 |

FOREIGN PATENT DOCUMENTS

| | | |
|---|---|---|
| JP | 5-345321 | 12/1993 |
| JP | 6-226742 | 8/1994 |

(Continued)

*Primary Examiner*—Geoffrey S Evans
(74) *Attorney, Agent, or Firm*—Hamre, Schumann, Mueller & Larson, P.C.

(57) ABSTRACT

A metal coating removing apparatus (1) includes a first electrode (13) arranged so as to be opposed to a metal coating (101) as an object to be removed, a second electrode 14 arranged so as to be opposed to the metal coating (101) at a predetermined distance from the first electrode (13), and a pulse power generator (11), for example, that functions as a discharge energy supply portion. The pulse power generator (11) supplies discharge energy between the first electrode (13) and the second electrode (14) so as to allow discharging to occur between the first electrode (13) and the second electrode (14). By allowing discharging to occur between the first electrode (13) and the second electrode (14), the metal coating (101) can be removed.

26 Claims, 32 Drawing Sheets

FOREIGN PATENT DOCUMENTS

| | | | |
|---|---|---|---|
| JP | 07-39037 A * | 2/1995 | |
| JP | 7-99144 | 4/1995 | |
| JP | 2000-037622 | 2/2000 | |
| SU | 493329 A * | 2/1976 | |
| WO | WO 96/12598 | 5/1996 | |

* cited by examiner

METAL COATING REMOVING APPARATUS AND METAL COATING REMOVING METHOD

TECHNICAL FIELD

The present invention relates to an apparatus and a method for removing a metal coating provided on a surface of a resin, and particularly to an apparatus and a method for removing a metal coating with a view to recycling resins.

BACKGROUND ART

In recent years, there is a demand for recycling resin products used in electric equipment and the like for the purpose of recycling resources. A lot of resin products used in electric equipment have their surfaces covered with a metal coating, which has to be removed when recycling resins.

Conventionally, it has been proposed to put a resin product with a metal coating into hot water so as to heat the same, thereby removing the metal coating (see, for example, Patent document 1). More specifically, the resin product, whose metal coating provided on its surface is cut with a cutter or the like previously, is heated in hot water with a temperature of 70° C. or higher for several hours, and then the metal coating is removed with running water.

Further, the following method also has been proposed to recover resins from a resin plate with a metal coating. That is, the resin plate provided with the metal coating initially is rolled, then the rolled resin plate is brought into contact with hot water or steam so as to allow resins to swell, the resin plate is pressed further, and then the metal coating is removed with running heated water (see, for example, Patent document 2).

Patent document 1: JP 5(1993)-345321 A
Patent document 2: International Publication No. 96/12598

However, although the above-mentioned conventional methods are capable of removing a metal coating with a relatively low adhesion strength, such as a vapor deposited film, it is difficult to remove a metal coating with a large thickness and a high adhesion strength, such as a plating film for ornamental purposes. Moreover, since the above-mentioned conventional methods include treatment with hot water, which makes resins swell, dehydration is required for recycling of resins.

DISCLOSURE OF INVENTION

A metal coating removing apparatus according to the present invention for removing a metal coating provided on a surface of a resin, includes: a first electrode arranged so as to be opposed to an object to be removed; a second electrode arranged so as to be opposed to the object to be removed at a predetermined distance from the first electrode; and a discharge energy supply portion for supplying discharge energy between the first electrode and the second electrode so as to allow discharging to occur between the first electrode and the second electrode.

A metal coating removing method according to the present invention for removing a metal coating provided on a surface of a resin, includes: arranging a first electrode and a second electrode so that they are opposed to an object to be removed; and supplying discharge energy between the first electrode and the second electrode so as to allow discharging to occur between the first electrode and the second electrode, thereby removing the object to be removed.

DESCRIPTION OF THE INVENTION

Figure 1:
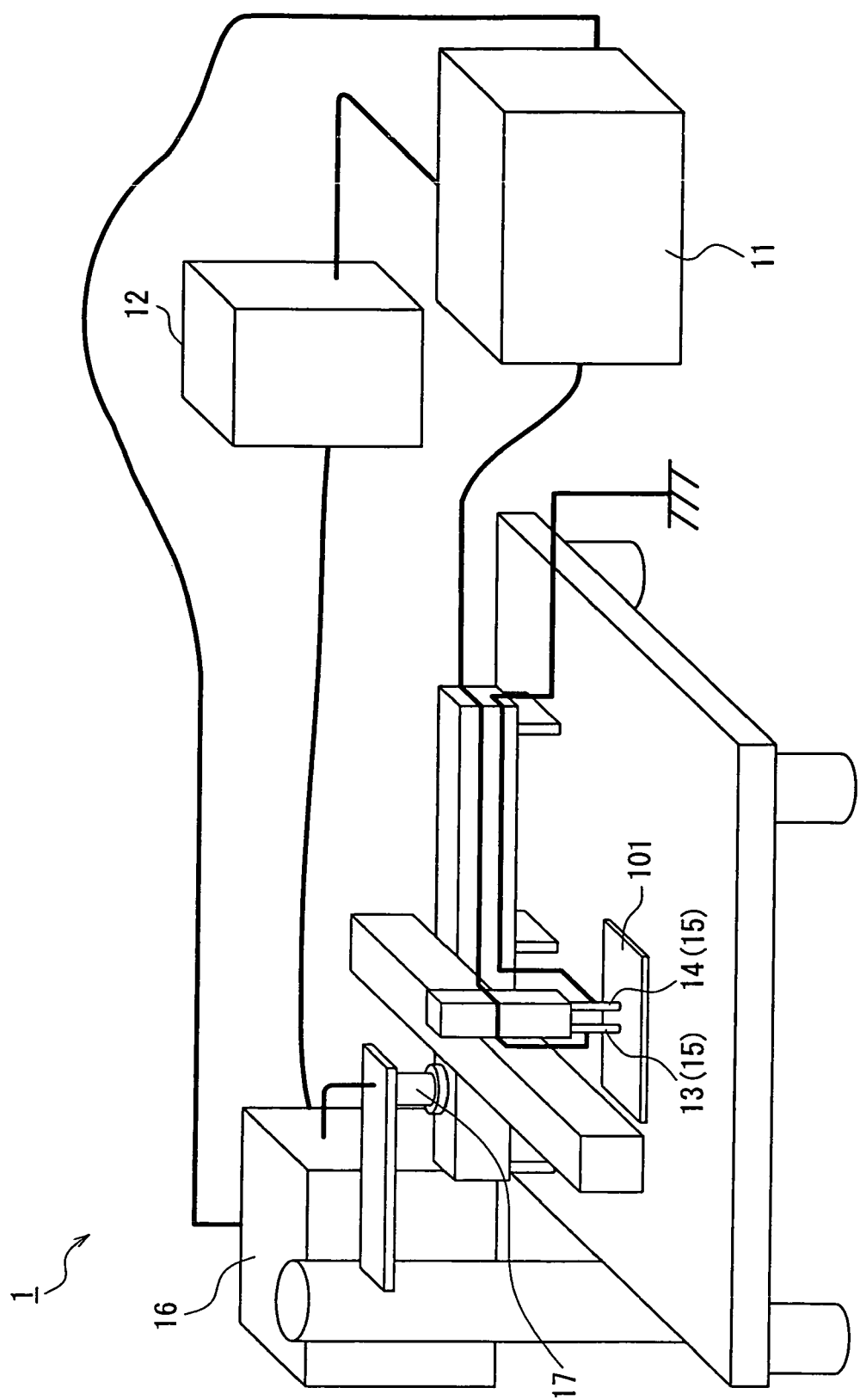
FIG. 1 is a perspective view showing a configuration of a metal coating removing apparatus according to Embodiment 1 of the present invention.

A metal coating removing apparatus according to the present invention allows discharging to occur between a first electrode and a second electrode arranged so as to be opposed to a metal coating as an object to be removed, thereby removing the metal coating provided on a surface of a resin. Therefore, even when the object to be removed is a metal coating with a high adhesion strength or with a large thickness, it is possible to remove the object to be removed from the resin efficiently. Further, the resin does not swell during a metal coating removal operation, and therefore this apparatus can be used suitably with a view to recycling resins.

Preferably, in the metal coating removing apparatus according to the present invention, at least one of the first electrode and the second electrode is covered with an insulating cover made of an insulating material except for at least a portion opposed to the object to be removed. This allows discharging to occur in a predetermined space, so that increased impact energy can be applied to the object to be removed by discharging. Accordingly, with an increase in impact energy, a removal area of the object to be removed becomes larger, resulting in an increase in removal efficiency. Further, the insulating cover and the electrode covered with the insulating cover may be provided so that relative positions of the insulating cover and the electrode are adjustable. Further, the insulating cover is provided so that one end of the insulating cover contacts with the object to be removed during a removal operation, and the electrode covered with the insulating cover may be provided so as to be kept from contact with the object to be removed during the removal operation.

The metal coating removing apparatus according to the present invention further may include an output control portion for controlling the discharge energy supply portion, wherein the output control portion controls at least either one of an amount of the discharge energy and a discharge frequency supplied from the discharge energy supply portion. This allows discharging to occur in accordance with the thickness or the type of a metal of the object to be removed, resulting in efficient removal.

The metal coating removing apparatus according to the preset invention further may include an electrode-to-electrode distance control portion for controlling a distance between the first electrode and the second electrode. This makes it possible to select the distance between the electrodes in accordance with the thickness or the type of a metal of the object to be removed, resulting in efficient removal.

The metal coating removing apparatus according to the present invention further may include an electrode-to-object to be removed distance control portion for controlling a distance between the first electrode as well as the second electrode and the object to be removed. This makes it possible to select the distance between the electrodes and the object to be removed in accordance with the thickness or the type of a metal of the object to be removed, resulting in efficient removal.

The metal coating removing apparatus according to the present invention further may include an electrode angle control portion for controlling an angle of the first electrode and the second electrode with respect to the object to be removed in a range of 0 to 90 degrees. This makes it possible to select the angle of the electrodes in accordance with the thickness or the type of a metal of the object to be removed, resulting in efficient removal.

The metal coating removing apparatus according to the present invention further may include an image recognition portion for recognizing a shape of the object to be removed. This makes it possible to arrange the electrodes and the like in accordance with the shape of the object to be removed, resulting in efficient removal.

The metal coating removing apparatus according to the present invention further may include a film thickness measurement portion for measuring a thickness of the object to be removed. This makes it possible to change the discharge energy and the like as appropriate in accordance with the film thickness of the object to be removed, and therefore efficient removal can be achieved regardless of the film thickness of the object to be removed.

The metal coating removing apparatus according to the present invention further may include a metal recognition portion for recognizing a type of a metal of the object to be removed. This makes it possible to change the discharge energy and the like as appropriate in accordance with the type of a metal of the object to be removed, and therefore efficient removal can be achieved regardless of the type of a metal of the object to be removed.

Preferably, in the metal coating removing apparatus according to the present invention, a distance between the first electrode and the second electrode is not less than 1 mm and not more than 20 mm. When the distance between the electrodes is not less than 1 mm, a phenomenon in which a current flows only through the air between the first electrode and the second electrode due to dielectric breakdown caused in the air between the electrodes can be suppressed. Therefore, a further increase in removal efficiency can be achieved. Further, when the distance between the electrodes is not more than 20 mm, a removal portion can be connected reliably between the first electrode and the second electrode, and therefore it is possible to prevent the object to be removed from being left partially. Note here that the distance between the first electrode and the second electrode used herein is a distance between portions of the first electrode and the second electrode where discharging occurs. In the case of rod-shape electrodes, for example, this distance is a distance between front end portions of the electrodes where discharging occurs.

Preferably, in the metal coating removing apparatus according to the present invention, a distance between the first electrode as well as the second electrode and the object to be removed is not less than 0.1 mm and not more than 3.0 mm. By setting the distance between the electrodes and the object to be removed within this range, the metal coating can be removed efficiently while burning and melting of the resin during discharging are suppressed. Note here that the distance between the first electrode as well as the second electrode and the object to be removed used herein is a distance between portions of the first electrode as well as the second electrode where discharging occurs and the object to be removed. In the case of rod-shape electrodes, for example, this distance is a distance between front end portions of the electrodes where discharging occurs and the object to be removed.

Preferably, in the metal coating removing apparatus according to the present invention, an angle (inclination angle of each of the first electrode and the second electrode with respect to a surface of the object to be removed) of the first electrode and the second electrode with respect to the object to be removed is not less than 15 degrees and not more than 90 degrees. Most preferably, the angle of the electrodes is 45 degrees. The reason for this is that a larger removal area can be obtained.

The metal coating removing apparatus according to the present invention further may include a plasma generation portion for generating plasma between the first electrode and the second electrode. The plasma generation portion may supply discharge energy between the first electrode and the second electrode so as to allow discharging (preliminary discharging) to occur between the first electrode and the second electrode, thereby generating plasma. Preferably, the preliminary discharging is performed in the vicinity of a conductive material. By providing this plasma generation portion, in the case, for example, where an insulating film is provided on a surface of the metal coating as an object to be removed or where a conductive portion and an insulating portion are mixed on a surface of the object to be removed, such as a printed board, the metal coating can be removed efficiently without applying a high voltage. The reason for this is as follows. That is, when an insulating portion is provided on a surface of the object to be removed, a high dielectric breakdown voltage is required. However, by generating plasma between the electrodes, the dielectric breakdown voltage can be reduced, and thus discharging can occur without applying a high voltage. Further, when preliminary discharging is performed in the vicinity of a conductive material, it is possible to generate plasma that allows the plasma state to be maintained even when the distance between the electrodes is increased after the preliminary discharging. In order to maintain the plasma state, thermal plasma is generated preferably. To this end, it is preferable to use electrodes formed of a material with high electric resistance, so that the electrodes easily liberate heat by application of a voltage during preliminary discharging. For example, electrodes formed of a material containing tungsten or the like can be used suitably.

The metal coating removing apparatus according to the present invention further may include an insulating member arranged between the first electrode and the second electrode. With this configuration, the insulating member limits a discharge space during discharging for the removal of the coating, and therefore the metal coating can be removed efficiently.

The metal coating removing apparatus according to the present invention may include an insulating cap for covering front end portions of the first electrode and the second electrode. The insulating cap limits a discharge space, and therefore the metal coating can be removed efficiently.

A metal coating removing method according to the present invention allows discharging to occur between a first electrode and a second electrode arranged so as to be opposed to a metal coating as an object to be removed, thereby removing the metal coating provided on a surface of a resin. Therefore, even when the object to be removed is a metal coating with a high adhesion strength or with a large thickness, it is possible to remove the object to be removed. Further, the resin does not swell during a metal coating removal operation, and therefore this method can be used suitably with a view to recycling resins.

The metal coating removing method according to the present invention may include controlling at least either one of an amount of the discharge energy and a discharge frequency in accordance with at least either one of a thickness and a type of a metal of the object to be removed. This makes it possible to change the discharge energy and the like as appropriate in accordance with the thickness or the type of the object to be removed, and therefore efficient removal can be achieved regardless of the thickness or the type of the object to be removed.

The metal coating removing method according to the present invention may include controlling a distance between the first electrode and the second electrode in accordance with at least either one of a thickness and a type of a metal of the object to be removed. This makes it possible to change the distance between the electrodes as appropriate in accordance with the thickness or the type of the object to be removed, and therefore efficient removal can be achieved regardless of the thickness or the type of the object to be removed.

The metal coating removing method according to the present invention may include controlling a distance between the first electrode as well as the second electrode and the object to be removed in accordance with at least either one of a thickness and a type of a metal of the object to be removed. This makes it possible to change the distance between the electrodes and the object to be removed as appropriate in accordance with the thickness or the type of the object to be removed, and therefore efficient removal can be achieved regardless of the thickness or the type of the object to be removed.

The metal coating removing method according to the present invention may include controlling an angle of the first electrode and the second electrode with respect to the object to be removed in accordance with at least either one of a thickness and a type of a metal of the object to be removed. This makes it possible to change the angle of the electrodes as appropriate in accordance with the thickness or the type of the object to be removed, and therefore efficient removal can be achieved regardless of the thickness or the type of the object to be removed.

The metal coating removing method according to the present invention may include: subjecting the object to be removed to test removal ahead of time; measuring a removal area obtained by the test removal; and controlling at least either one of an amount of the discharge energy and a discharge frequency in accordance with a result of measuring the removal area. This makes it possible to set an appropriate discharge energy and the like in accordance with the object to be removed, and therefore efficient removal can be achieved regardless of the thickness or the type of the object to be removed.

The metal coating removing method according to the present invention may include generating plasma between the first electrode and the second electrode before arranging the first electrode and the second electrode so that they are opposed to the object to be removed. The plasma can be generated by, for example, supplying discharge energy between the first electrode and the second electrode so as to allow preliminary discharging to occur between the first electrode and the second electrode. Preferably, the preliminary discharging is performed in a state where, for example, the first electrode and the second electrode are arranged in the vicinity of a conductive material. When preliminary discharging is performed in the vicinity of a conductive material, plasma can be generated easily. By generating plasma ahead of time between the electrodes, in the case, for example, where an insulating film is provided on a surface of the metal coating as an object to be removed or where a conductive portion and an insulating portion are mixed on a surface of the object to be removed, such as a printed board, the metal coating can be removed efficiently without applying a high voltage.

Hereinafter, embodiments of the present invention will be described in detail with reference to the drawings.

Embodiment 1

An embodiment of an apparatus and a method for removing a metal coating according to the present invention will be described with reference to FIGS. 1 to 6.

Figure 2:
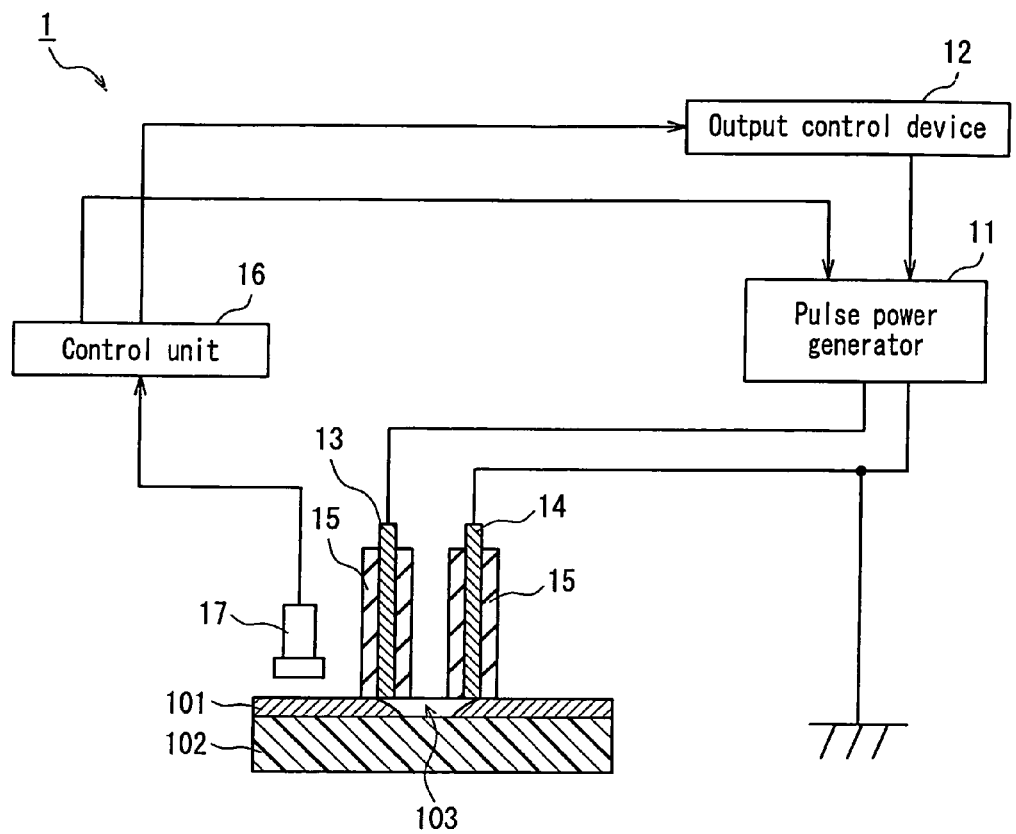
FIG. 2 is a view showing a schematic configuration of the metal coating removing apparatus according to Embodiment 1 of the present invention.

FIGS. 1 and 2 show a state where a metal coating (object to be removed) 101 provided on a surface of a resin 102 is removed by using a metal coating removing apparatus 1 of the present embodiment. FIG. 1 is a perspective view of the metal coating removing apparatus 1, and FIG. 2 is a view showing a schematic configuration of the metal coating removing apparatus 1. The metal coating removing apparatus 1 includes a pulse power generator (discharge energy supply portion) 11, an output control device (output control portion) 12, a first electrode 13 and a second electrode 14 as discharging electrodes, an insulating cover 15 for covering each of the first electrode 13 and the second electrode 14, and a control unit 16. The metal coating removing apparatus 1 further includes an image recognition device (image recognition portion) 17 for recognizing the shape of the resin 102 and the metal coating 101. The type of the resin 102 and the metal coating 101 as an object to be removed is not particularly limited. In FIG. 2, reference numeral 103 denotes a place where the metal coating is removed.

The pulse power generator 11 includes a power source (herein, a direct current power source) and a pulse discharge circuit (including, for example, a capacitor, a coil, and the like), and supplies discharge energy (apply a voltage) between the first electrode 13 and the second electrode 14, thereby allowing discharging to occur between the first electrode 13 and the second electrode 14. Herein, a pulse power is high-density energy concentrated in a small space in a short time (about μsec to nsec) by compressing stored energy in terms of time and space. A specific exemplary configuration of the pulse power generator 11 will be described later.

The output control device 12 controls the magnitude of the discharge energy (energy amount) and the frequency (discharge frequency) output from the pulse power generator 11 in accordance with the type of the metal coating 101, the thickness of the metal coating 101, and the like.

Figure 18:
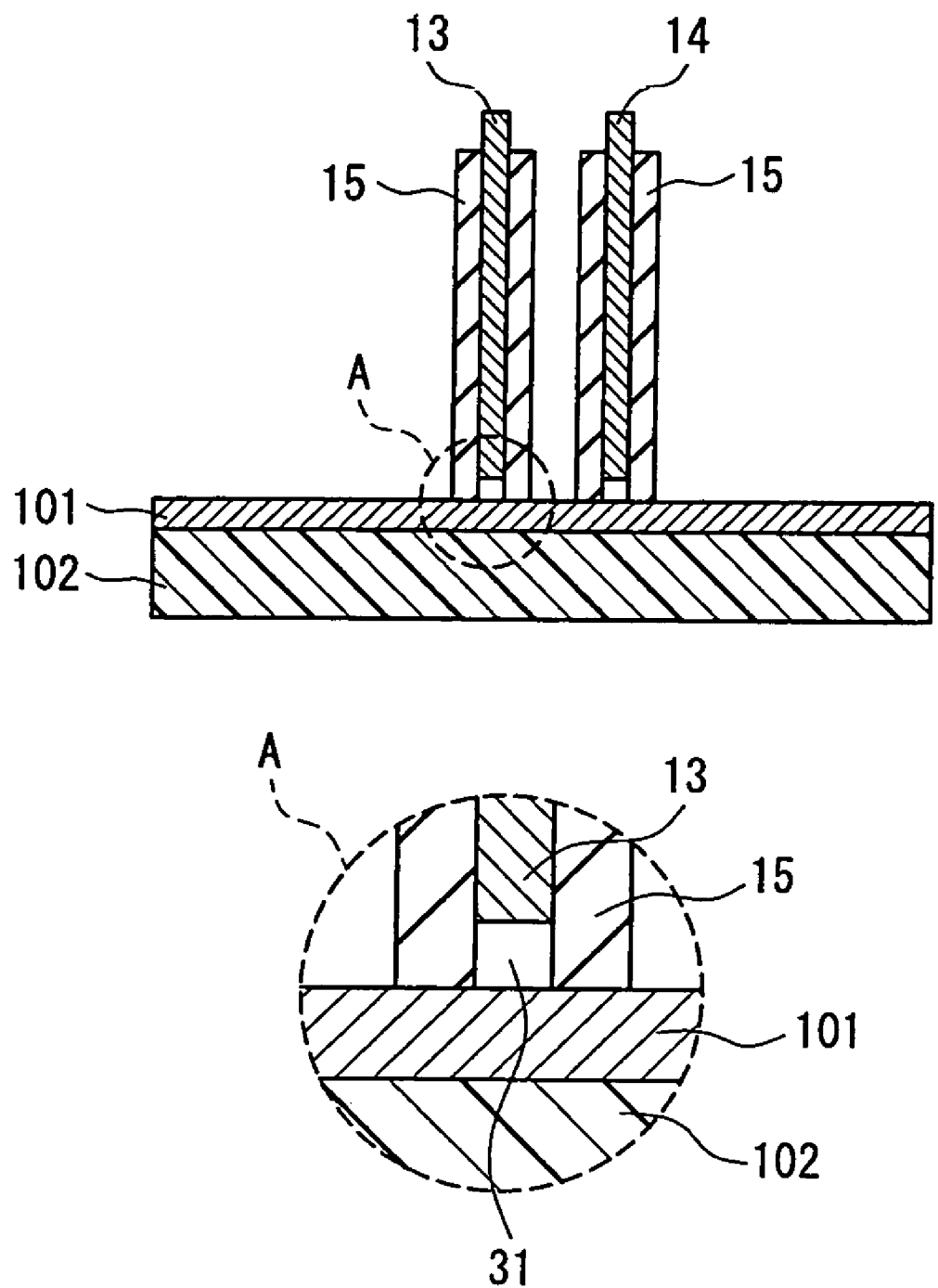
FIG. 18 is a cross-sectional view showing an exemplary positional relationship between the electrode and the insulating cover.

The first electrode 13 and the second electrode 14 have a rod shape, for example, and are arranged at a predetermined distance from each other. In order for discharging to occur, the first electrode 13 is supplied with a high electric potential, and the second electrode 14 is supplied with a ground potential, whereby discharging occurs between these electrodes. Preferably, the first electrode 13 and the second electrode 14 are formed of, for example, tungsten, a silver-tungsten alloy, a copper-tungsten alloy, or the like because these metals are consumed less after discharging. Further, preferably, the first electrode 13 and the second electrode 14 have as sharp a front end as possible so as to allow discharging to occur easily. Further, a distance between the first electrode 13 and the second electrode 14 is preferably 1 mm or more, and more preferably 1 mm to 20 mm in order to remove the object to be removed completely between the first electrode 13 and the second electrode 14. By setting the distance between the electrodes in this manner, discharging can occur efficiently, and it is possible to prevent a phenomenon in which no current flows through the metal coating 101 because of discharging occurring only between the electrodes, whereby the metal coating 101 can be removed efficiently. Further, a distance (gap) between the first electrode 13 as well as the second electrode 14 and the metal coating 101 is preferably 0.1 mm to 3.0 mm, and more preferably 0.1 mm to 1.0 mm. By setting the distance between the electrodes 13 and 14 and the metal coating 101 in this range, the resin 102 is prevented from being burned during discharging, and the metal coating 101 can be removed efficiently. When the electrodes 13 and 14 contact with the metal coating 101 directly, the resin 102 may be burned. For this reason, preferably, the electrodes 13 and 14 are kept from contact with the metal coating 101 as much as possible. For example, a structure as shown in FIG. 18 is also available, in which a front end of the insulating covers 15 is located closer to the metal coating 101 as an object to be removed than the front end of the electrodes 13 and 14, so that a space 31 is provided between the electrodes 13 and 14 and the metal coating 101, while the insulating covers 15 may contact with the metal coating 101 during discharging. When the electrodes 13 and 14 are kept from contact with the metal coating 101 in this manner, even if the insulating covers 15 contact with the metal coating 101, the resin 102 is less burned during discharging, and it is possible to suppress melting of the resin by heat generated by the electrodes 13 and 14 immediately after the discharging. Further, the position of the insulating covers 15 may be adjustable relative to that of the electrodes 13 and 14.

The insulating cover 15 covers each of the first electrode 13 and the second electrode 14, and is provided so that at least one end (portion opposed to the metal coating 101) of each of the first electrode 13 and the second electrode 14 is exposed.

By attaching the insulating cover 15 to each of the electrodes 13 and 14 in this manner, a space where a pulse power is supplied is compressed, resulting in an increase in removal efficiency. Preferably, the insulating cover 15 has high heat resistance because it has to withstand continuous discharging. On this account, an insulating material with high thermal conductivity, such as aluminum oxide, silicon nitride, diamond, or the like is used preferably as a material of the insulating cover 15.

The control unit 16 instructs the pulse power generator 11 to start discharging, controls the output control device 12 in accordance with information from the image recognition device 17, and the like.

Figure 3:
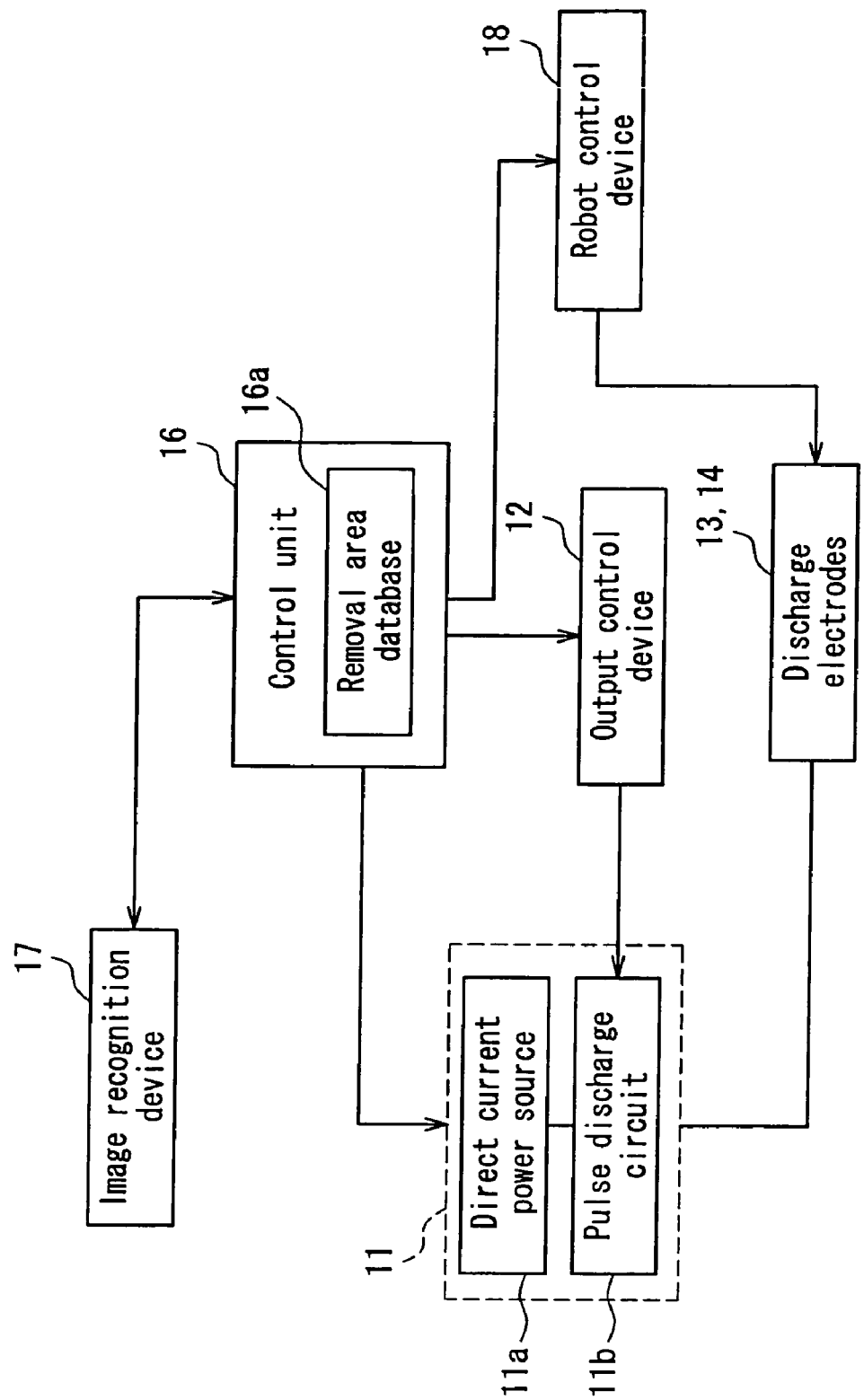
FIG. 3 is a block diagram showing the configuration of the metal coating removing apparatus according to Embodiment 1 of the present invention.
Figure 4:
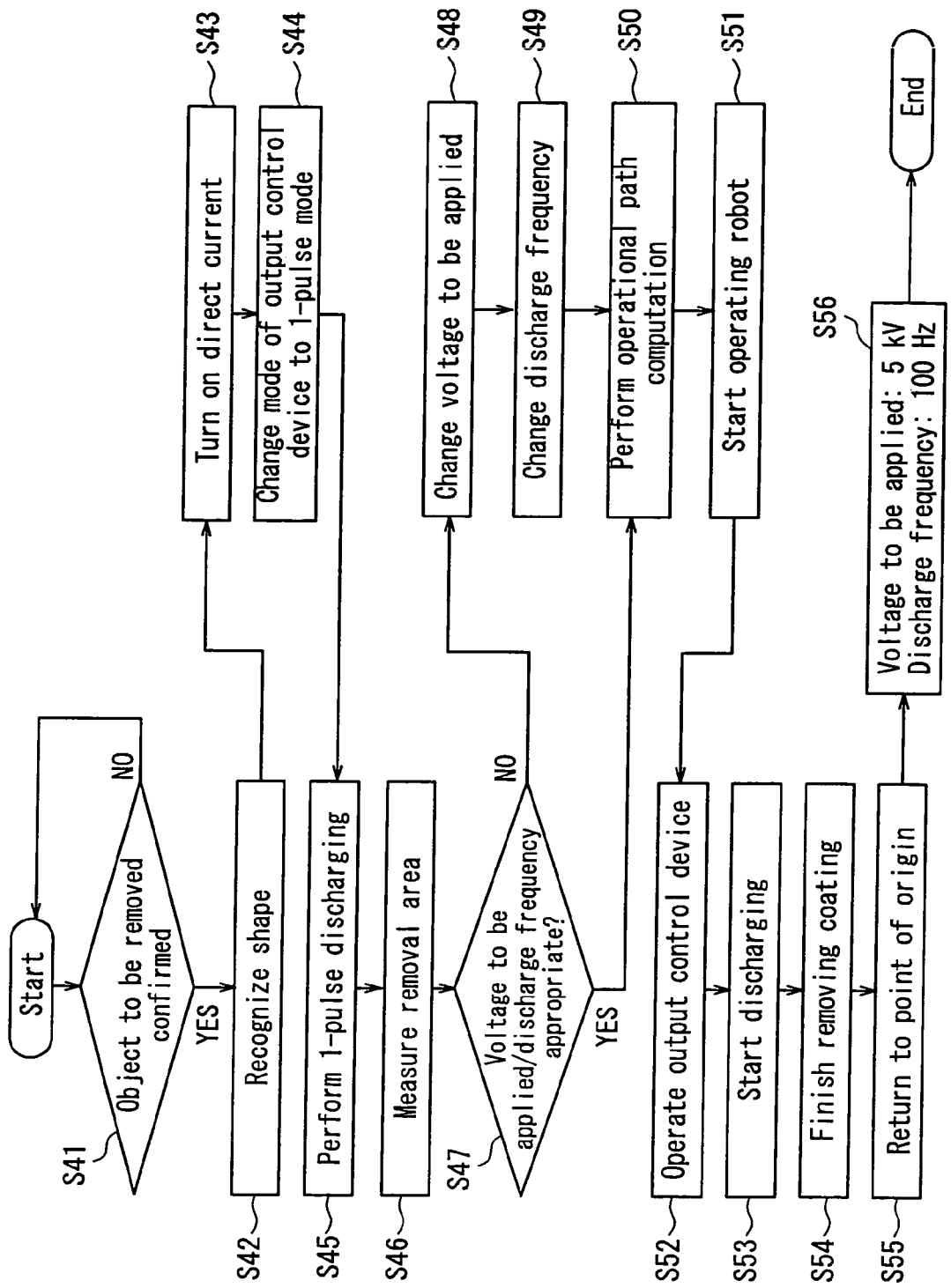
FIG. 4 is a flow chart showing an operation of the metal coating removing apparatus according to Embodiment 1 of the present invention.

Hereinafter, a processing operation of the metal coating removing apparatus 1 will be described with reference to FIGS. 3 and 4. FIG. 3 is a block diagram showing the configuration of the metal coating removing apparatus 1, and FIG. 4 is a flow chart showing the operation of the metal coating removing apparatus 1.

When the image recognition device 17 confirms the metal coating 101 as an object to be removed, the control unit 16 recognizes (stores) the shape of the object to be removed and, upon receipt of this information, turns on a direct current power source 11a of the pulse power generator 11 (Step (hereinafter, abbreviated as S) 41, S42, and S43).

Then, test removal is performed so as to determine the voltage to be applied (energy amount) and the discharge frequency. More specifically, the control unit 16 changes the mode of the output control device 12 to a 1-pulse mode (S44), and instructs the pulse power generator 11 to perform 1-pulse discharging with an applied voltage of 5 kV with respect to the object to be removed (S45). An area where the object was removed by the 1-pulse discharging is measured by the image recognition device 17 (S46). The control unit 16 compares the information on the removal area from the image recognition device 17 with data in a removal area database 16a, so as to judge whether or not an initialized voltage to be applied (herein, 5 kV, for example) and an initialized discharge frequency (herein, 100 Hz, for example) are appropriate (S47). If it is judged that the initialized voltage to be applied and the initialized discharge frequency are not appropriate, they are changed so as to be suitable for the object to be removed (S48 and S49). After the test removal, the control unit 16 changes the mode of the output control unit 12 from the 1-pulse mode to a continuous discharge mode.

After the voltage to be applied and the discharge frequency are judged as being appropriate in S47 or after the values of the voltage to be applied and the discharge frequency are changed appropriately in S48 and S49, respectively, the control unit 16 performs an operation to obtain an operational method suitable for the shape of the object to be removed, and issues the instruction to a robot control device (not shown in FIGS. 1 and 2) 18 based on the result of the operation (S50).

The robot control device 18 is operated so as to move each of the first electrode 13 and the second electrode 14 to a predetermined position (S51). Then, the output control device 12 is operated to issue an instruction concerning the voltage to be applied and the discharge frequency to the pulse power generator 11, thereby preparing for discharging (S52). The pulse power generator 11 starts discharging based on the data from the output control device 12 (S53).

When the removal is completed, discharging is stopped so as to finish removing the coating (S54). Thereafter, the robot control device 18 is operated so as to return the first electrode 13 and the second electrode 14 to their points of origin (S55), the voltage to be applied and the discharge frequency of the output control device 12 are set to their initial values (voltage to be applied: 5 kV, discharge frequency: 100 Hz), and the metal coating removal operation is finished.

Next, a description will be given of the data stored in the removal area database 16a. The removal area obtained by 1-pulse discharging varies depending upon the applied voltage, the film thickness of the object to be removed, and the type of the object to be removed as shown in Table 1. Thus, the relationship between a removal area during test recording and an appropriate voltage to be applied as well as an appropriate discharge frequency in accordance with the removal area during the test recording is obtained previously, and these data are recorded in the removal area database 16a. Based on the removal area obtained as a result of the test removal, an applied voltage suitable for the object to be removed is obtained, and further a suitable discharge frequency is determined from the removal area database 16a. For example, in the case of a nickel-chromium plating film having a thickness of 30 μm shown in Table 1, the removal area per 1 pulse is 0 225 mm$^2$ even when the applied voltage is set as high as 20 kV. Thus, the removal area is smaller in this case than in the case where a shield plating film having a thickness of 1.25 μm is removed with an applied voltage of 5 kV. Consequently, the discharge frequency is required to be set higher than that for the shield plating film. Note here that in Table 1 the shield plating film is a metal coating having a two-layer structure of copper (lower layer) and nickel (upper layer), and the nickel-chromium plating film is a metal coating having a three-layer structure of copper (lower layer), nickel (middle layer), and chromium (upper layer).

TABLE 1

(Capacity of capacitor: 16 nF)

| Metal coating | Film thickness (μm) | Removal area (mm$^2$) | | | |
| --- | --- | --- | --- | --- | --- |
| | | 5 kV (0.2 J/pulse) | 10 kV (0.8 J/pulse) | 15 kV (1.8 J/pulse) | 20 kV (3.2 J/pulse) |
| Shield plating film | 1.25 | 0.666 | 2.202 | 3.800 | 4.959 |
| Nickel-chromium plating film | 30 | 0.019 | 0.067 | 0.310 | 0.225 |

Next, a specific example of the pulse power generator 11 will be described with reference to FIGS. 5 and 6.

Figure 5:
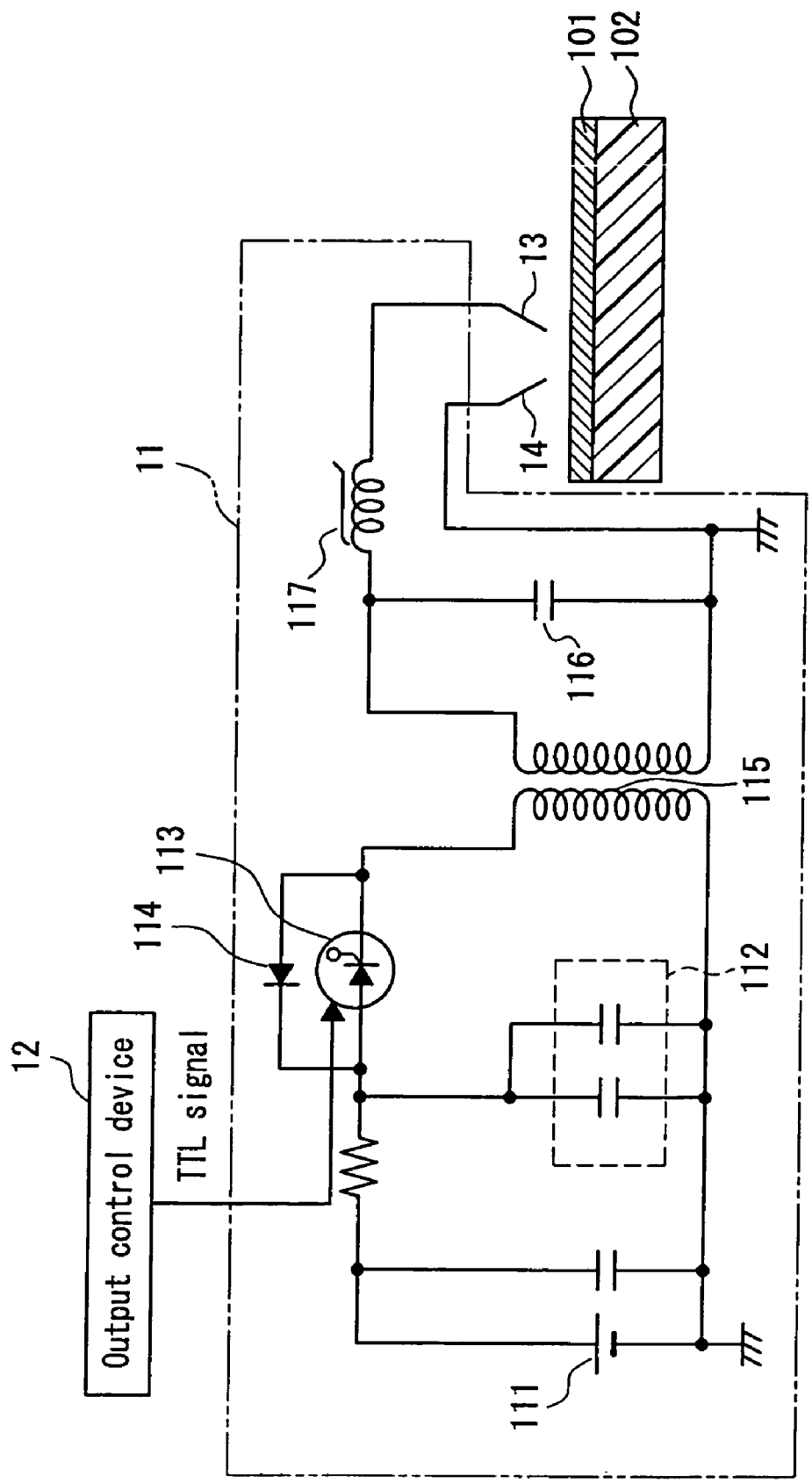
FIG. 5 is a circuit diagram showing an exemplary configuration of a pulse power generator.

FIG. 5 shows an exemplary configuration of the pulse discharge circuit of the pulse power generator 11. In the exemplary configuration shown in FIG. 5, the pulse power generator 11 includes a primary-side circuit and a secondary-side circuit. In the pulse power generator 11 having such a configuration, when a direct current power source 111 is turned on by the instruction from the control unit 16, a capacitor 112 of the primary-side circuit starts being charged. The output control device 12 determines the discharge frequency, and generates a TTL signal, thereby turning on a switch 113 (e.g., a thyristor). While the switch 113 is opened for a predetermined period of time, a current flows instantaneously by the electric charge held by the capacitor 112. Since an inverse current flows from the capacitor 112 thereafter, a diode 114 is connected in parallel with the switch 113. When a transformer 115 is pressurized, a capacitor 116 of the secondary circuit is charged (energy is transferred to the capacitor 116). A magnetic switch 117 is controlled by a voltage and a time. Until a voltage applied to the magnetic switch 117 reaches a predetermined level and a predetermined period of time has elapsed, no voltage is applied to the first electrode 13, so that no discharging occurs. When the voltage applied to the magnetic switch 117 reaches a predetermined level and a predetermined period of time has elapsed, the magnetic switch 117 is turned on, so that a current flows through the first electrode 13, and a pulse power is applied to a surface of the metal coating 101, whereby the metal coating 101 is removed.

Figure 6:
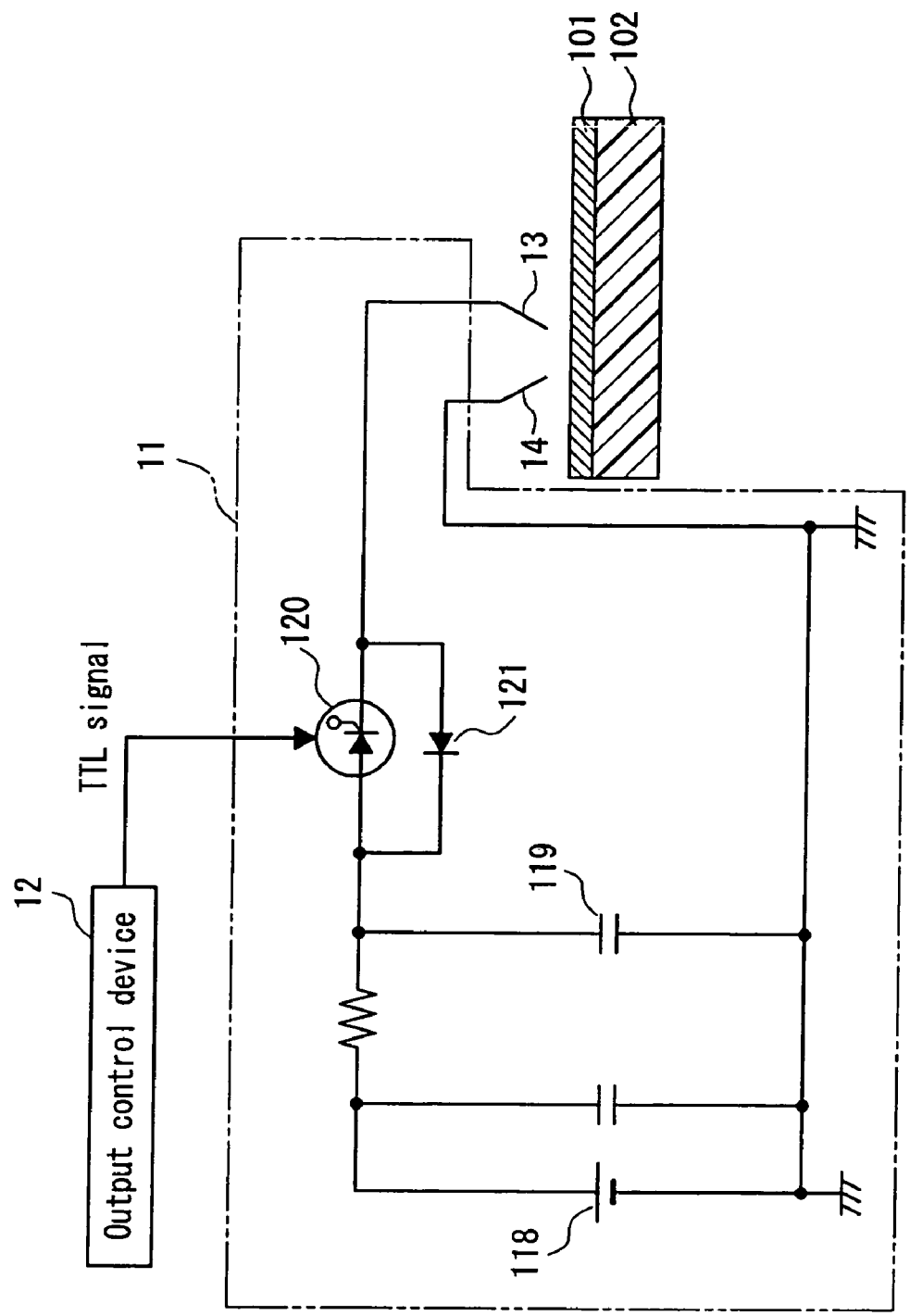
FIG. 6 is a circuit diagram showing another exemplary configuration of the pulse power generator.

FIG. 6 shows another exemplary configuration of the pulse discharge circuit of the pulse power generator 11. In this configuration, when a direct current power source 118 is turned on by the instruction from the control unit 16, a capacitor 119 starts being charged. The output control device 12 determines the discharge frequency, and generates a TTL signal, thereby turning on a switch 120. While the switch 120 is opened for a predetermined period of time, a current flows instantaneously by the electric charge held by the capacitor 119. Since an inverse current flows from the capacitor 119 thereafter, a diode 121 is connected in parallel with the switch 120. A current flows through the first electrode 13 from the capacitor 119, and a pulse power is applied to a surface of the metal coating 101, whereby the metal coating 101 is removed. In each of the exemplary configurations shown in FIGS. 5 and 6, a higher reactance between the capacitor 116, 119 and the first electrode 13 results in a longer discharge time, and therefore, preferably, the reactance is reduced as much as possible so as to compress energy in terms of time.

Embodiment 2

Another embodiment of an apparatus and a method for removing a metal coating according to the present invention will be described with reference to FIGS. 7 to 10.

Figure 7:
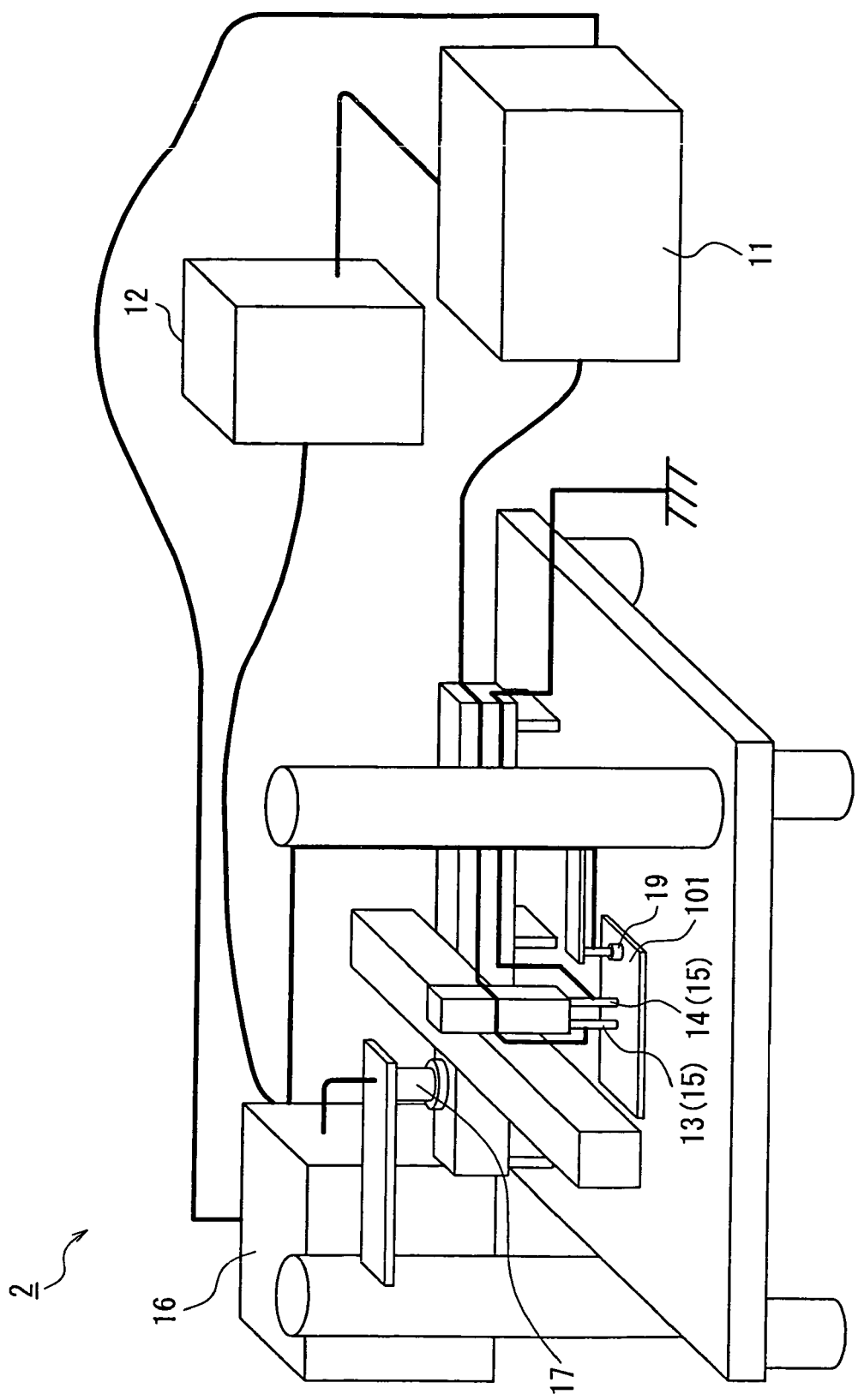
FIG. 7 is a perspective view showing a configuration of a metal coating removing apparatus according to Embodiment 2 of the present invention.
Figure 8:
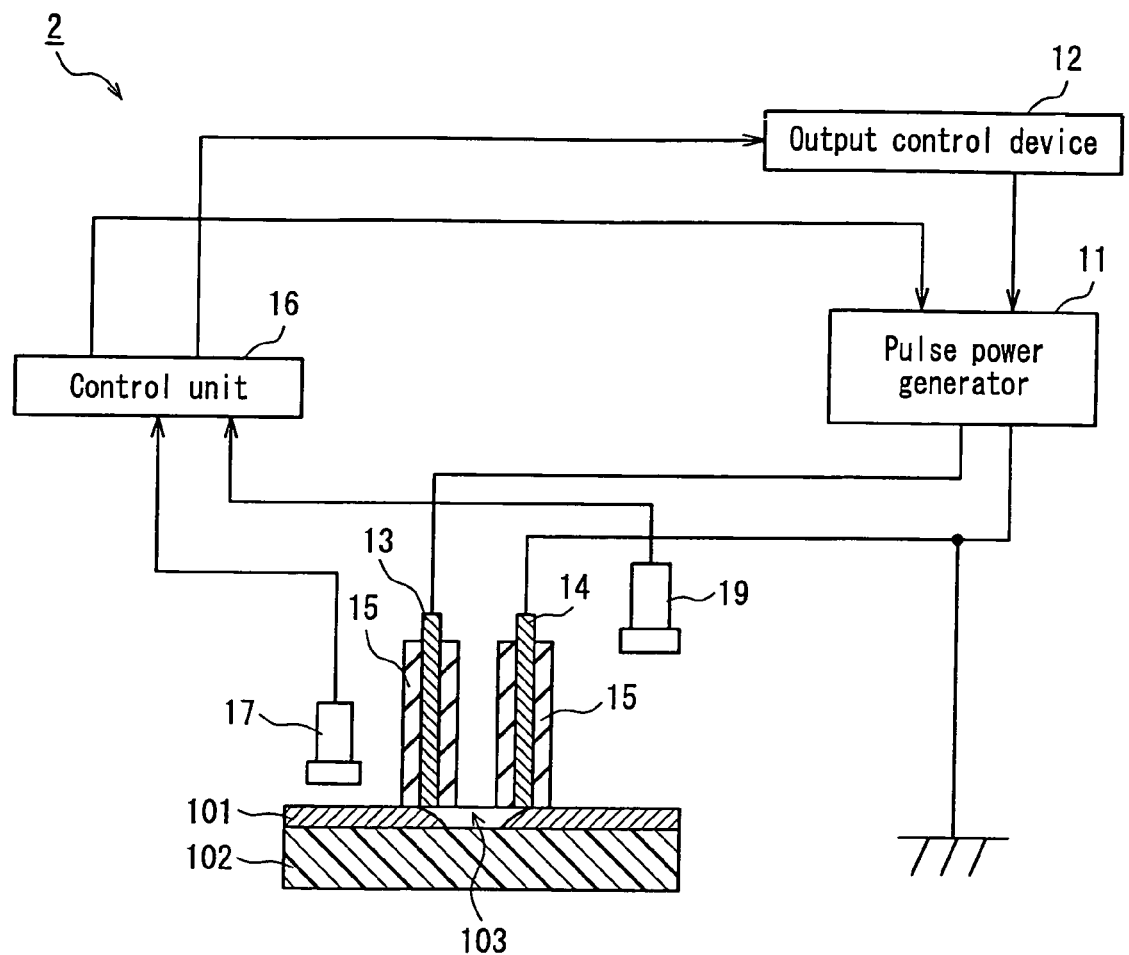
FIG. 8 is a view showing a schematic configuration of the metal coating removing apparatus according to Embodiment 2 of the present invention.

FIGS. 7 and 8 show a state where a metal coating 101 provided on a surface of a resin 102 is removed by using a metal coating removing apparatus 2 of the present embodiment. FIG. 7 is a perspective view of the metal coating removing apparatus 2, and FIG. 8 is a view showing a schematic configuration of the metal coating removing apparatus 2. The metal coating removing apparatus 2 has the same configuration as that of the metal coating removing apparatus 1 of Embodiment 1 except that a film thickness measuring device (film thickness measurement portion) 19, such as a fluorescent X-ray device, for measuring the thickness of the metal coating 101 as an object to be removed is provided further. The metal coating removing apparatus 2 changes the magnitude of discharge energy (energy amount) and the frequency (discharge frequency) output from a pulse power generator 11 in accordance with the thickness of the object to be removed measured by the film thickness measuring device 19. The components common to those of the metal coating removing apparatus 1 described in Embodiment 1 are denoted with the same reference numerals, and detailed descriptions thereof will be omitted here.

Figure 9:
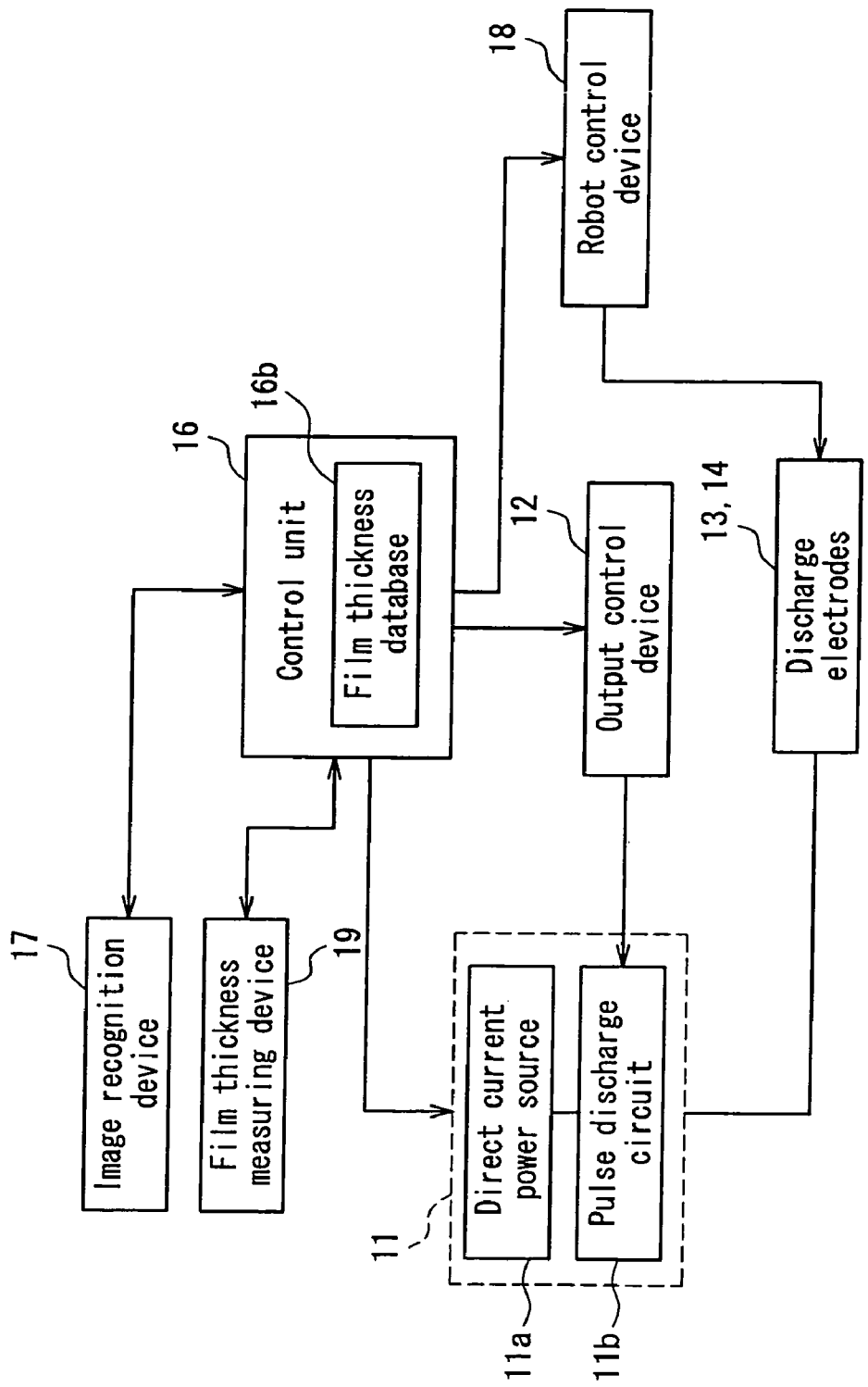
FIG. 9 is a block diagram showing the configuration of the metal coating removing apparatus according to Embodiment 2 of the present invention.
Figure 10:
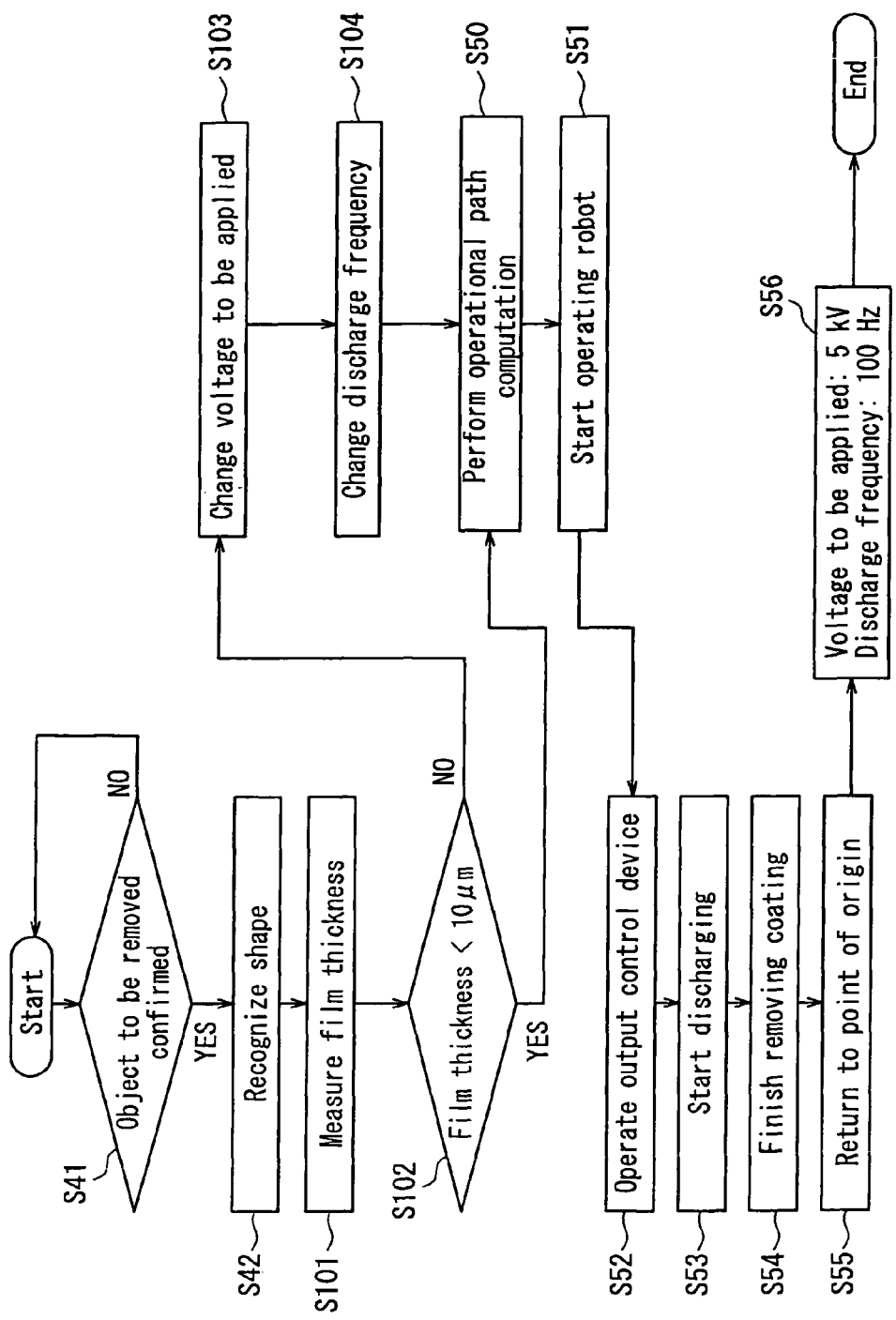
FIG. 10 is a flow chart showing an operation of the metal coating removing apparatus according to Embodiment 2 of the present invention.

Hereinafter, a processing operation of the metal coating removing apparatus 2 will be described with reference to FIGS. 9 and 10. FIG. 9 is a block diagram showing the configuration of the metal coating removing apapratus 2, and FIG. 10 is a flow chart showing the operation of the metal coating removing apparatus 2.

When an image recognition device 17 confirms the object to be removed, a control unit 16 recognizes the shape of the object to be removed, which is performed in the same manner as for the metal coating removing apparatus 1 in Embodiment 1 (S41 and S42). However, the metal coating removing apparatus 2 determines the amount of the discharge energy and the discharge frequency in a manner different from that of the metal coating removing apparatus 1.

The metal coating removing apparatus 2 lowers, for example, a probe (not shown) for measuring a film thickness provided in the film thickness measuring device 19 by using a motor or the like, for example, so as to measure the film thickness of the object to be removed (S110). Then, based on the result of measuring the film thickness, it is determined whether or not an initialized voltage to be applied and an initialized discharge frequency are appropriate with respect to the film thickness of the object to be removed. In the present embodiment, the initial value of the voltage to be applied is 5 kV, and the initial value of the discharge frequency is 100 Hz. Thus, if the film thickness is smaller than 10 µm, for example, as a result of the measurement, it is judged that the removal can be performed at the initial values. If the film thickness is 10 µm or larger, it is judged that changes of the initial values are necessary (S102). If it is judged in S102 that changes of the initial values are unnecessary, a direct current power source 11*a* is switched on. If it is judged in S102 that changes of the initial values are necessary, the control unit 16 compares the information on the measured film thickness with data in a film thickness database 16*b*, and changes the initialized voltage to be applied and the initialized discharge frequency into ones suitable for the film thickness of the object to be removed (S103 and S104). According to this processing, an appropriate voltage to be applied and an appropriate discharge frequency can be set in accordance with the film thickness of the object to be removed, and therefore it is possible to remove the object to be removed stably even when it has a large film thickness.

The processing to be performed after determining the voltage to be applied and the discharge frequency in accordance with the film thickness of the object to be removed is the same as that in S50 to S56 of the metal coating removing apparatus 1 described in Embodiment 1, and a description thereof will be omitted here.

Embodiment 3

Still another embodiment of an apparatus and a method for removing a metal coating according to the present invention will be described with reference to FIGS. 11 to 17.

Figure 11:
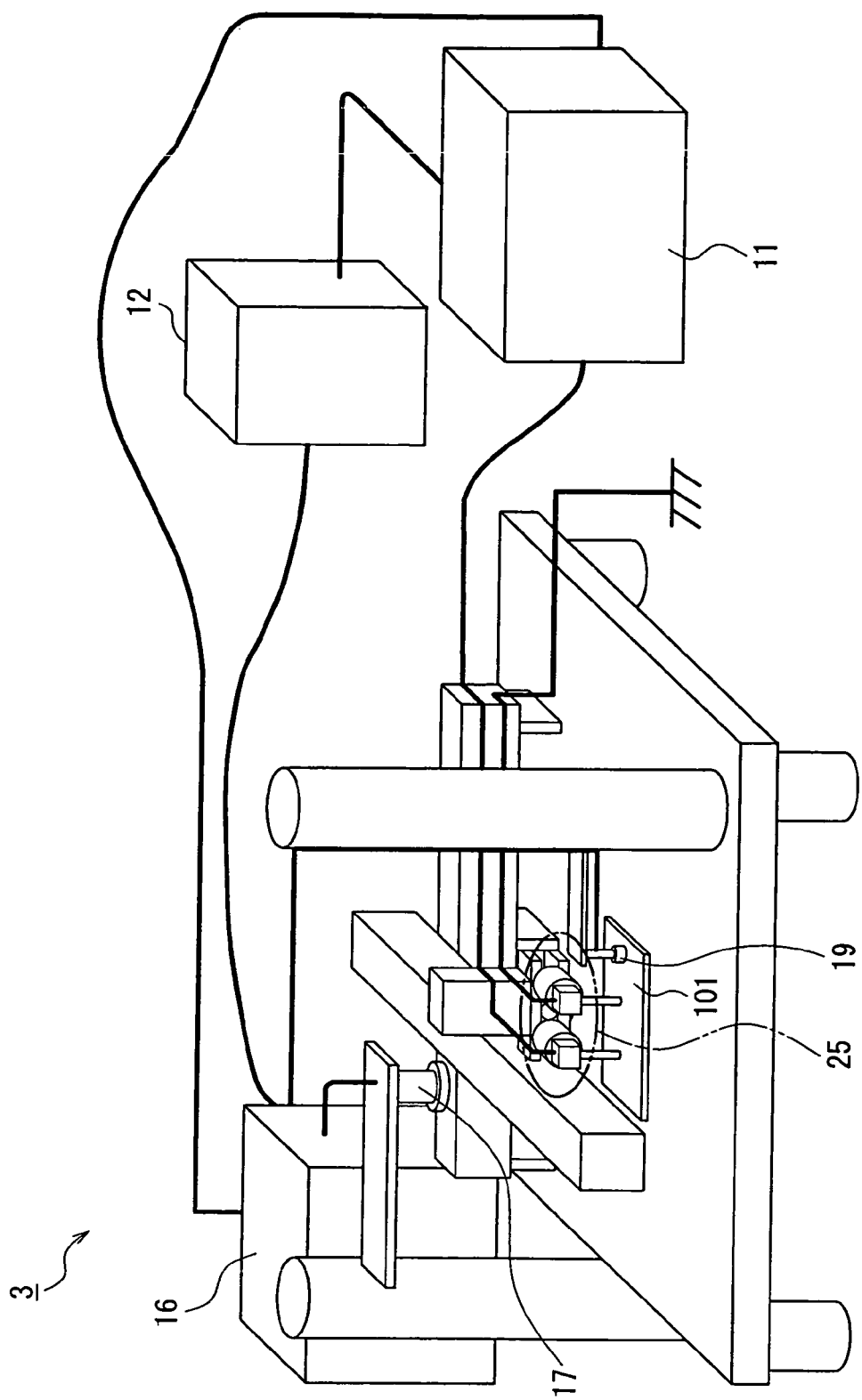
FIG. 11 is a perspective view showing a configuration of a metal coating removing apparatus according to Embodiment 3 of the present invention.
Figure 12:
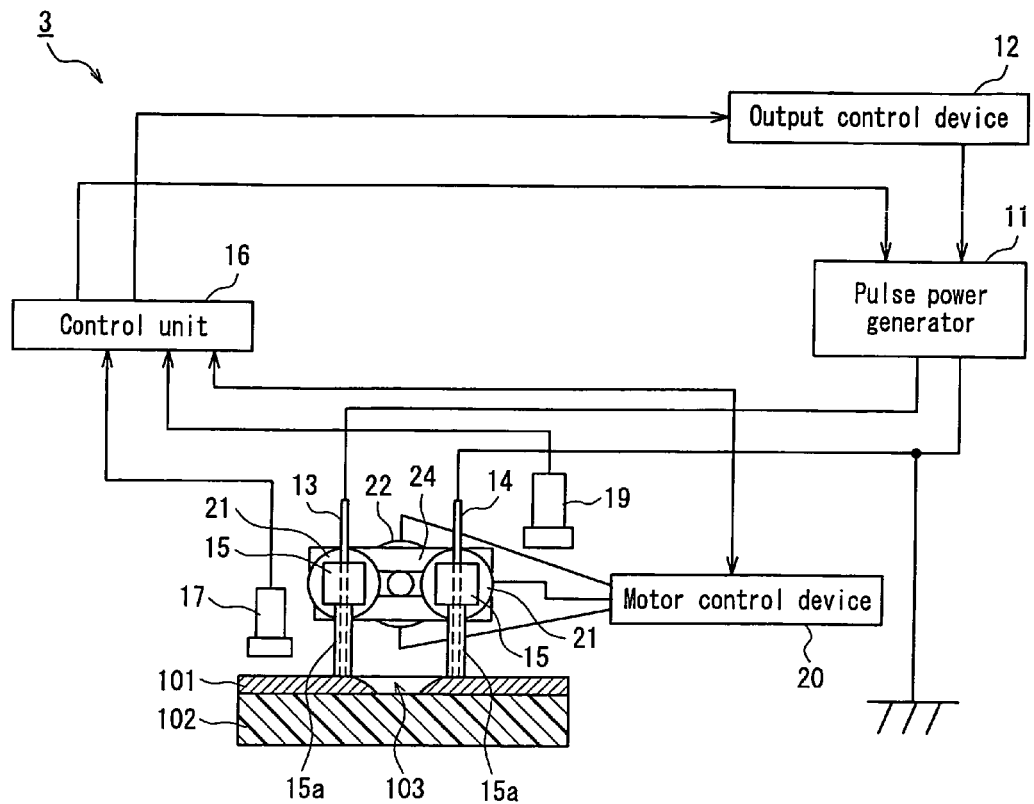
FIG. 12 is a view showing a schematic configuration of the metal coating removing apparatus according to Embodiment 3 of the present invention.

FIGS. 11 and 12 show a state where a metal coating 101 provided on a surface of a resin 102 is removed by using a metal coating removing apparatus 3 of the present embodiment. FIG. 11 is a perspective view of the metal coating removing apparatus 3, and FIG. 12 is a view showing a schematic configuration of the metal coating removing apparatus 3. The metal coating removing apparatus 3 has the same configuration as that of the metal coating removing apparatus 2 of Embodiment 2 except that a mechanism 25 for controlling a first electrode 13 and a second electrode 14 is provided. More specifically, the metal coating removing apparatus 3 is different from the metal coating removing apparatus 2 in that a distance between the first electrode 13 and the second electrode 14 is made variable, which can be controlled by an electrode-to-electrode distance control portion, and that an angle of the first electrode 13 and the second electrode 14 with respect to the object to be removed is made variable, which can be controlled by an electrode angle control portion. The components common to those of the metal coating removing apparatuses 1 and 2 are denoted with the same reference numerals, and detailed descriptions thereof will be omitted here.

Figure 13:
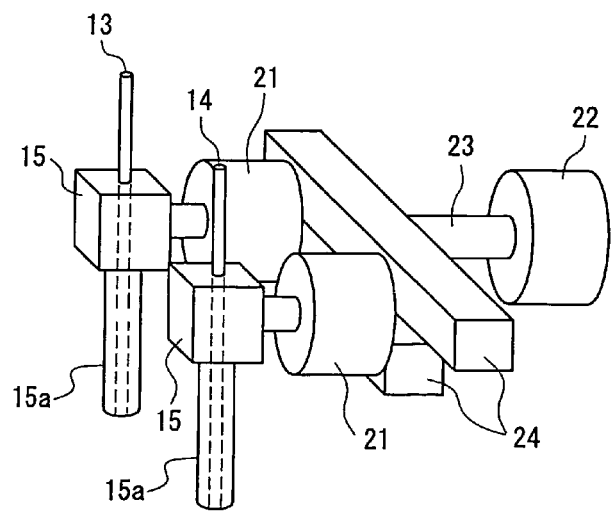
FIG. 13 is a perspective view showing in detail a mechanism for controlling electrodes of the metal coating removing apparatus according to Embodiment 3 of the present invention.
Figure 14A:
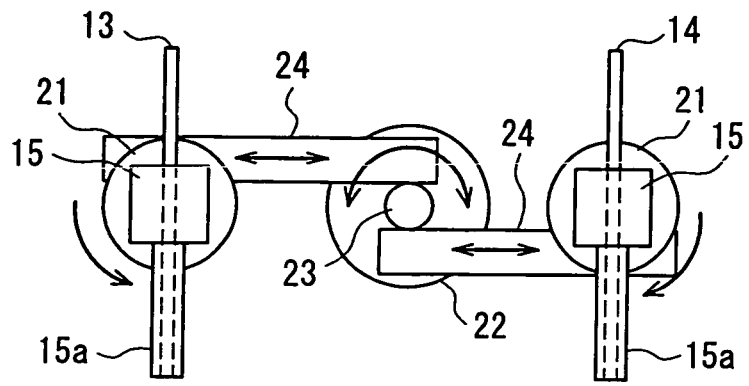
FIGS. 14A to 14D are views specifically illustrating states where a distance between the electrodes and an angle of the electrodes are adjusted.
Figure 14B:
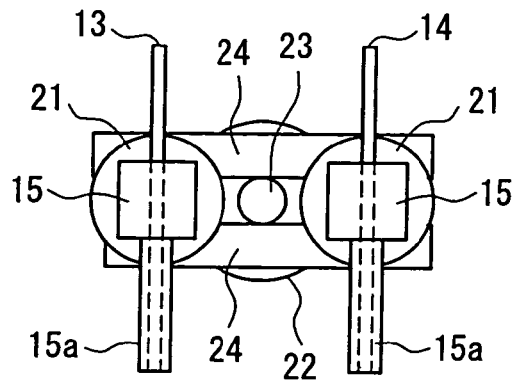
Figure 14C:
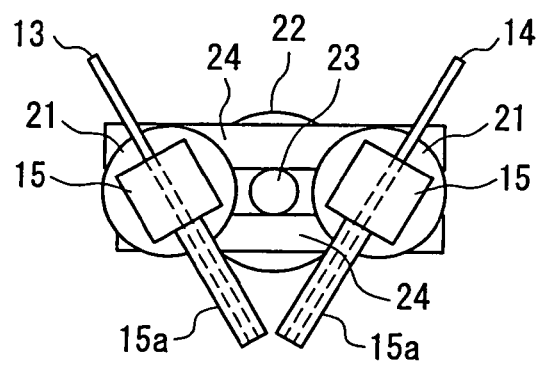
Figure 14D:
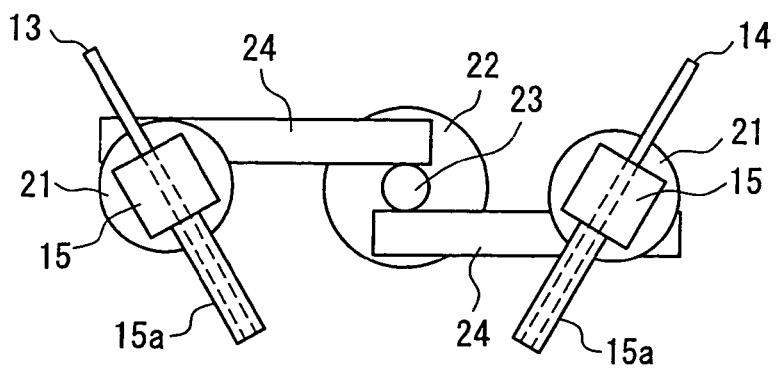

FIGS. 12 and 13 specifically show the mechanism for controlling the first electrode 13 and the second electrode 14. Each of the first electrode 13 and the second electrode 14 is covered with an insulating cover 15, and is connected with an electrode angle adjusting motor 21 via the insulating cover 15. In FIGS. 12 and 13, reference numeral 15*a* denotes a ceramic tube constituting the insulating cover 15, which is formed integrally with a portion of the insulating cover 15 where the electrode angle adjusting motor 21 is joined. The angle of the first electrode 13 and the second electrode 14 with respect to the object to be removed can be adjusted by operating the electrode angle adjusting motor 21. Further, each of the first electrode 13 and the second electrode 14 is joined to a rack gear 24 via the electrode angle adjusting motor 21, the rack gear 24 being moved linearly from side to side by the rotation of a pinion gear 23 (not shown in FIG. 12). The pinion gear 23 is joined to an electrode-to-electrode distance adjusting motor 22 and is rotated by operating the electrode-to-electrode distance adjusting motor 22. The electrode angle adjusting motor 21 and the electrode-to-electrode distance adjusting motor 22 are controlled by a motor control portion 20. The motor control portion 20 controls the electrode angle adjusting motor 21 and the electrode-to-electrode distance adjusting motor 22 upon receipt of a control signal from a control unit 16. Thus, in the present embodiment, the electrode-to-electrode distance control portion is constituted by the control unit 16, the motor control portion 20, the electrode-to-electrode distance adjusting motor 22, the pinion gear 23, and the rack gear 24. The electrode angle control portion is constituted by the control unit 16, the motor control portion 20, and the electrode angle adjusting motor 21. FIGS. 14A to 14D show in detail states where the distance between the electrodes and the angle of the electrodes are adjusted.

Figure 15:
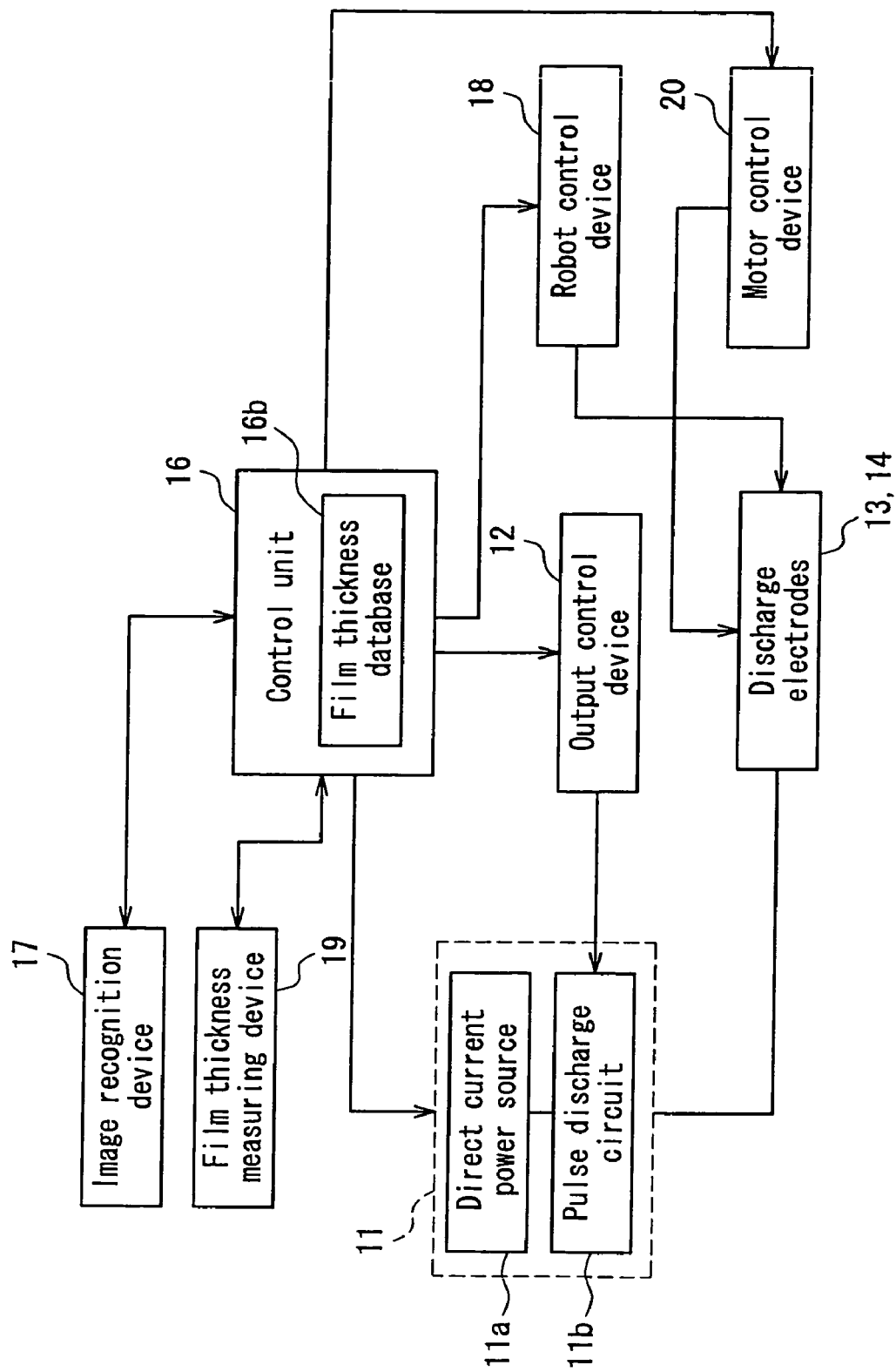
FIG. 15 is a block diagram showing the configuration of the metal coating removing apparatus according to Embodiment 3 of the present invention.
Figure 16:
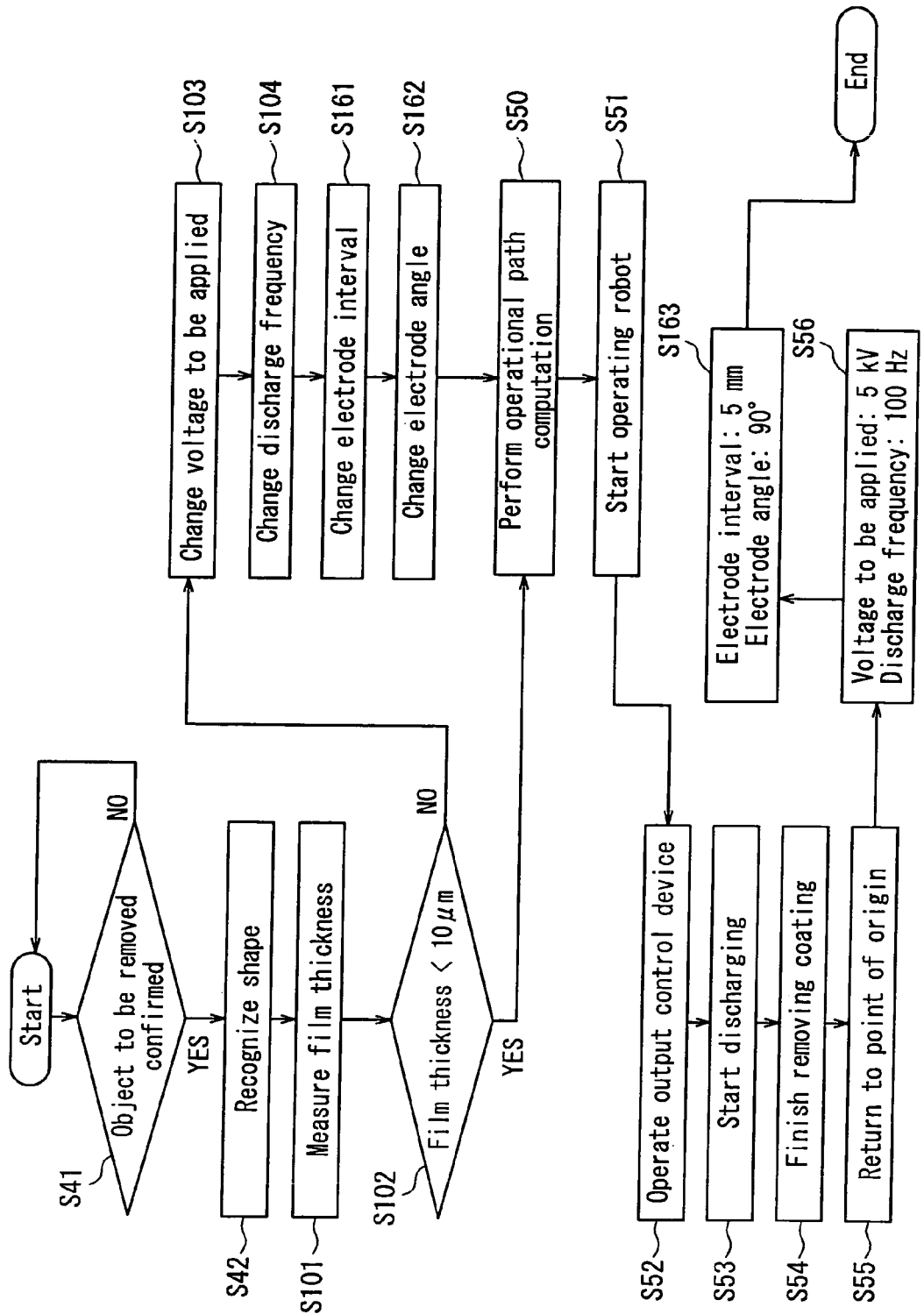
FIG. 16 is a flow chart showing an operation of the metal coating removing apparatus according to Embodiment 3 of the present invention.

Next, a processing operation of the metal coating removing apparatus 3 will be described. The metal coating removing apparatus 3 is operated in the same manner as for the metal coating removing apparatus 2 described in Embodiment 2 except that the distance between the electrodes and the angle of the electrodes also are changed in accordance with the thickness of the object to be removed measured by a film thickness measuring device 19. Hereinafter, the processing operation of the metal coating removing apparatus 3 will be described with reference to FIGS. 15 and 16. FIG. 15 is a block diagram showing the configuration of the metal coating removing apparatus 3, and FIG. 16 is a flow chart showing the operation of the metal coating removing apparatus 3.

An image recognition device 17 confirms the object to be removed (S41), the control unit 16 recognizes the shape of the object to be removed (S42), and the film thickness is measured and the voltage to be applied and the discharge frequency are changed (S10 to S104) in the same manner as for the metal coating removing apparatuses 1 and 2. The metal coating removing apparatus 3 further is capable of changing the distance between the electrodes and the angle of the electrodes in accordance with the film thickness of the object to be removed (S161 and S162). According to this processing, an appropriate distance between the electrodes and an appropriate angle of the electrodes can be set in accordance with the film thickness of the object to be removed, and therefore it is possible to remove the object to be removed stably regardless of its film thickness.

The processing to be performed after determining the voltage to be applied and the discharge frequency in accordance with the film thickness of the object to be removed is the same as that in S50 to S56 of the metal coating removing apparatus 1 described in Embodiment 1, and a description thereof will be omitted here. Note here that the distance between the electrodes and the angle of the electrodes are returned to their initial values finally (herein, the distance between the electrodes is 5 mm and the angle of the electrodes is 90°, for example) (S163).

Figure 17:
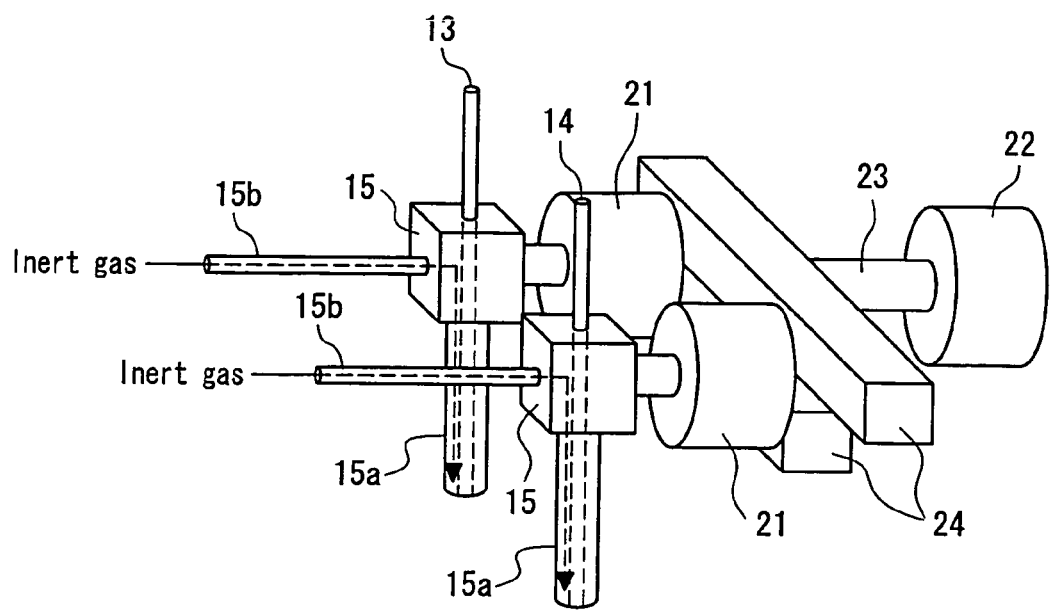
FIG. 17 is a perspective view showing a configuration in which a gas injection portion is provided additionally at an insulating cover.

Further, as shown in FIG. 17, the insulating cover 15 may be provided with a gas injection portion 15b that allows gas to be injected along the electrode, so that inert gas can be injected along the electrodes 13 and 14. Inert gas injected along the electrodes 13 and 14 suppresses carbonization of the resin and oxide formation from components of the metal coating during discharging, resulting in an increase in resin recycling rate and metal recycling rate. The configuration shown in FIG. 17 allows inert gas to be injected partially to discharge portions. However, the same effect can be achieved by performing the removal operation in a state where the entire metal coating removing apparatus 3 is kept under vacuum.

Each of the above-described metal coating removing apparatuses 2 and 3 according to Embodiments 2 and 3 has a configuration that allows the voltage to be applied and the like to be changed only in accordance with the film thickness of the object to be removed. However, a metal recognition device (metal recognition portion) may be provided further for recognizing a metal of the object to be removed, which allows the voltage to be applied and the like to be determined also in consideration of the type of the metal. Such a configuration enables more efficient removal of the metal coating. As the metal recognition device, a device can be used that recognizes a metal by means of, for example, emission spectrochemical analysis, fluorescent X-ray analysis, resistivity measurement, or the like. Further, the above-described metal coating removing apparatus according to each of Embodiments 1 to 3 has a configuration in which the robot control device 18 is used to move the electrodes 13 and 14 to predetermined positions set previously. However, a configuration may be provided further for controlling a distance between the electrodes and the object to be removed in accordance with the film thickness of the object to be removed or the like, so that the distance between the electrodes and the object to be removed can be changed in accordance with the film thickness of the object to be removed or the like.

Embodiment 4

Another embodiment of an apparatus and a method for removing a metal coating according to the present invention will be described with reference to FIGS. 19 to 26.

Figure 19:
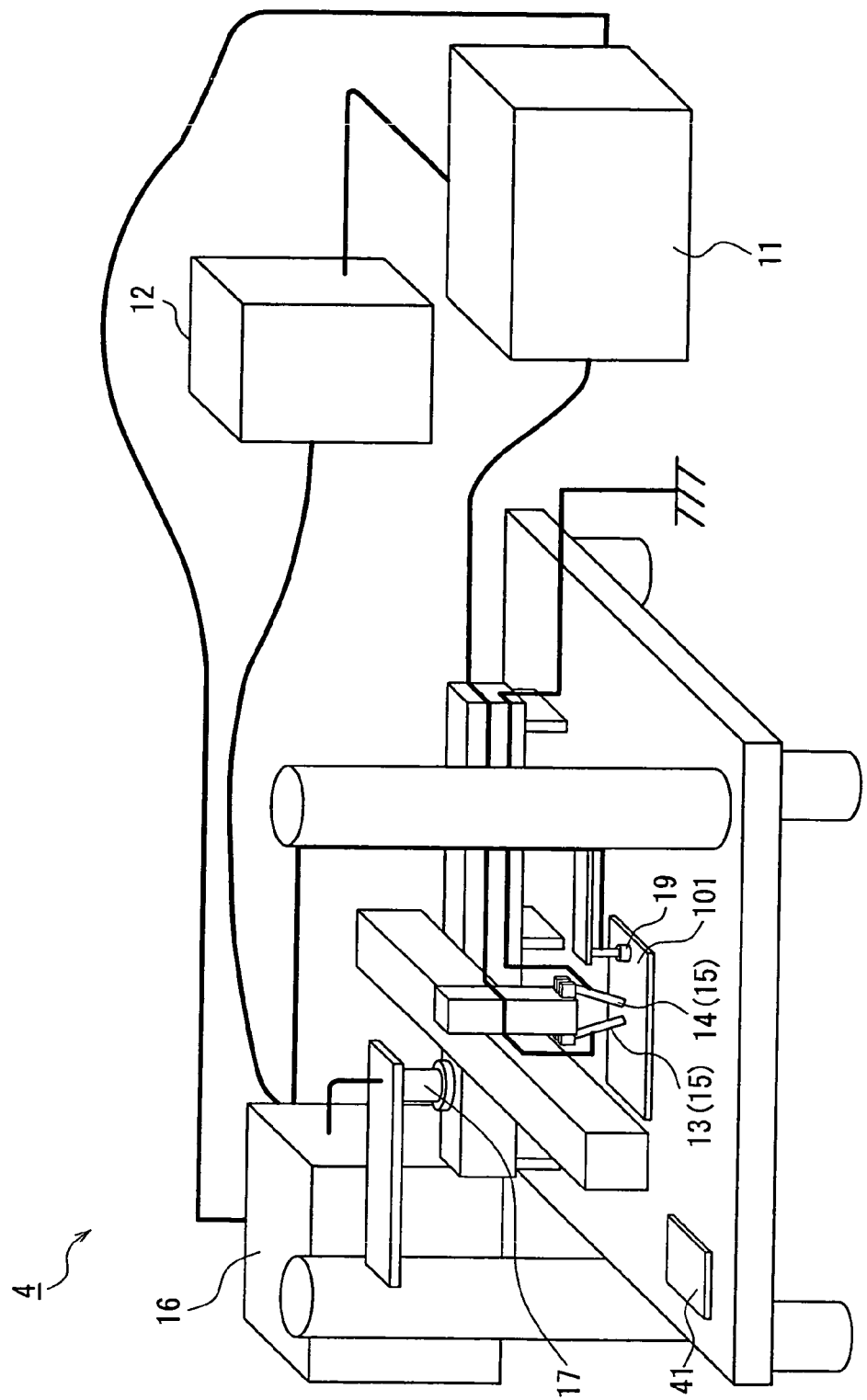
FIG. 19 is a perspective view showing a configuration of a metal coating removing apparatus according to Embodiment 4 of the present invention.

FIG. 19 shows a state where a metal coating 101 provided on a surface of a resin is removed by using a metal coating removing apparatus 4 of the present embodiment. FIG. 19 is a perspective view of the metal coating removing apparatus 4. The metal coating removing apparatus 4 has the same configuration as that of the metal coating removing apparatus 2 of Embodiment 2 except that a configuration (plasma generation portion) for generating plasma between a first electrode 13 and a second electrode 14 before a removal operation is provided and that the first electrode 13 and the second electrode 14 are arranged so that a predetermined distance (distance between the electrodes that allows plasma generation) is kept between front end portions of the electrodes. The metal coating removing apparatus 4 generates plasma ahead of time between the first electrode 13 and the second electrode 14, and removes the metal coating 101 by using the first and second electrodes 13 and 14 with the plasma state maintained therebetween. The components common to those of the metal coating removing apparatuses 1 to 3 described in Embodiment 1 to 3 are denoted with the same reference numerals, and detailed descriptions thereof will be omitted here.

Figure 20A:
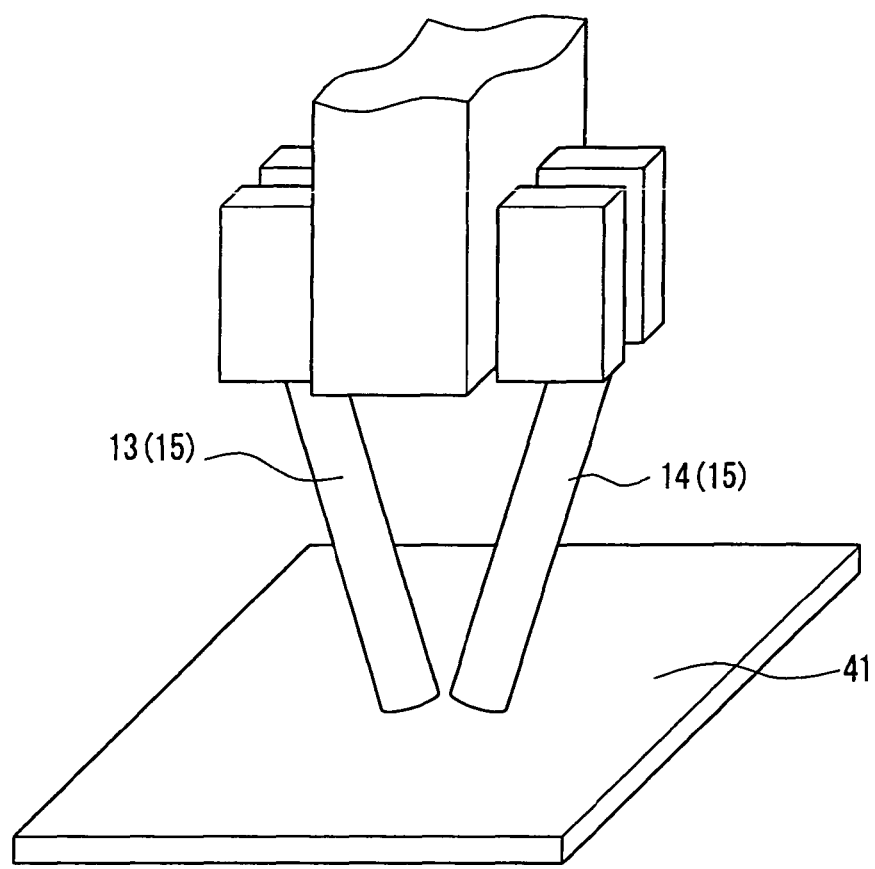
FIG. 20A is a perspective view showing an example of an electrode portion when preliminary discharging is performed by the metal coating removing apparatus shown in FIG. 19.
Figure 20B:
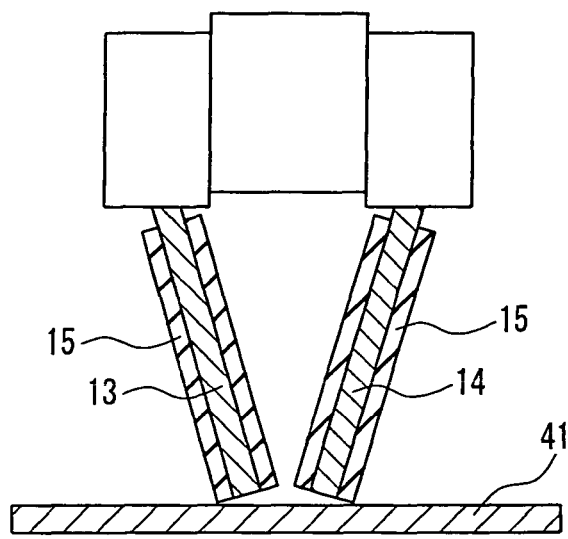
FIG. 20B is a side view corresponding to FIG. 20A, which includes a cross section of the electrode portion.

The metal coating removing apparatus 4 has a configuration for allowing discharging (preliminary discharging) to occur between the first electrode 13 and the second electrode 14 before discharging during a removal operation, thereby generating plasma between the first electrode 13 and the second electrode 14. More specifically, a conductive plate (conductive material) 41 is provided for preliminary discharging. The electrodes 13 and 14 are moved to the top of the conductive plate 41 and, as shown in FIGS. 20A and 20B, discharge energy is supplied (voltage is applied) between the first electrode 13 and the second electrode 14 on top of the conductive plate 41 to allow preliminary discharging to occur, so that thermal plasma is generated between the first electrode 13 and the second electrode 14. FIG. 20A is a perspective view of the electrodes during preliminary discharging, and FIG. 20B is a partially cross-sectional side view corresponding to FIG. 20A. Thus, in the present embodiment, the plasma generation portion is constituted by a pulse power generator 11 and the conductive plate 41. Thermal plasma is generated between the electrodes 13 and 14 that liberate heat by application of a voltage, and the heat thus generated allows the plasma state to be maintained until a removal operation without continuing to apply a voltage.

As described above, plasma is generated ahead of time between the electrodes 13 and 14, and a removal operation is performed while the plasma state is maintained. Therefore, even in the case where an insulating film is provided on a surface of the metal coating 101 as an object to be removed, such as a CD-ROM (Compact Disk-Read Only Memory), for example, the metal coating 101 can be removed from a resin 102 without increasing a voltage significantly. In the case where an insulating film is provided on the surface of the metal coating 101, in order to perform a removal operation without generating plasma between the electrodes 13 and 14, it is necessary to apply a high voltage or to bring the electrodes 13 and 14 into contact with the insulating film on the surface. A higher current value allows a larger removal area to be obtained. However, the current value decreases with an increase in voltage, resulting in a reduction in energy efficiency. Further, when the electrodes 13 and 14 are brought into contact with the insulating film on the surface, it becomes difficult to perform a removal operation while moving the electrodes 13 and 14, resulting in a decrease in workability. For these reasons, in the case of an object to be removed with an insulating film provided on its surface, the metal coating removing apparatus 4 as in the present embodiment is applied preferably.

Figure 21:
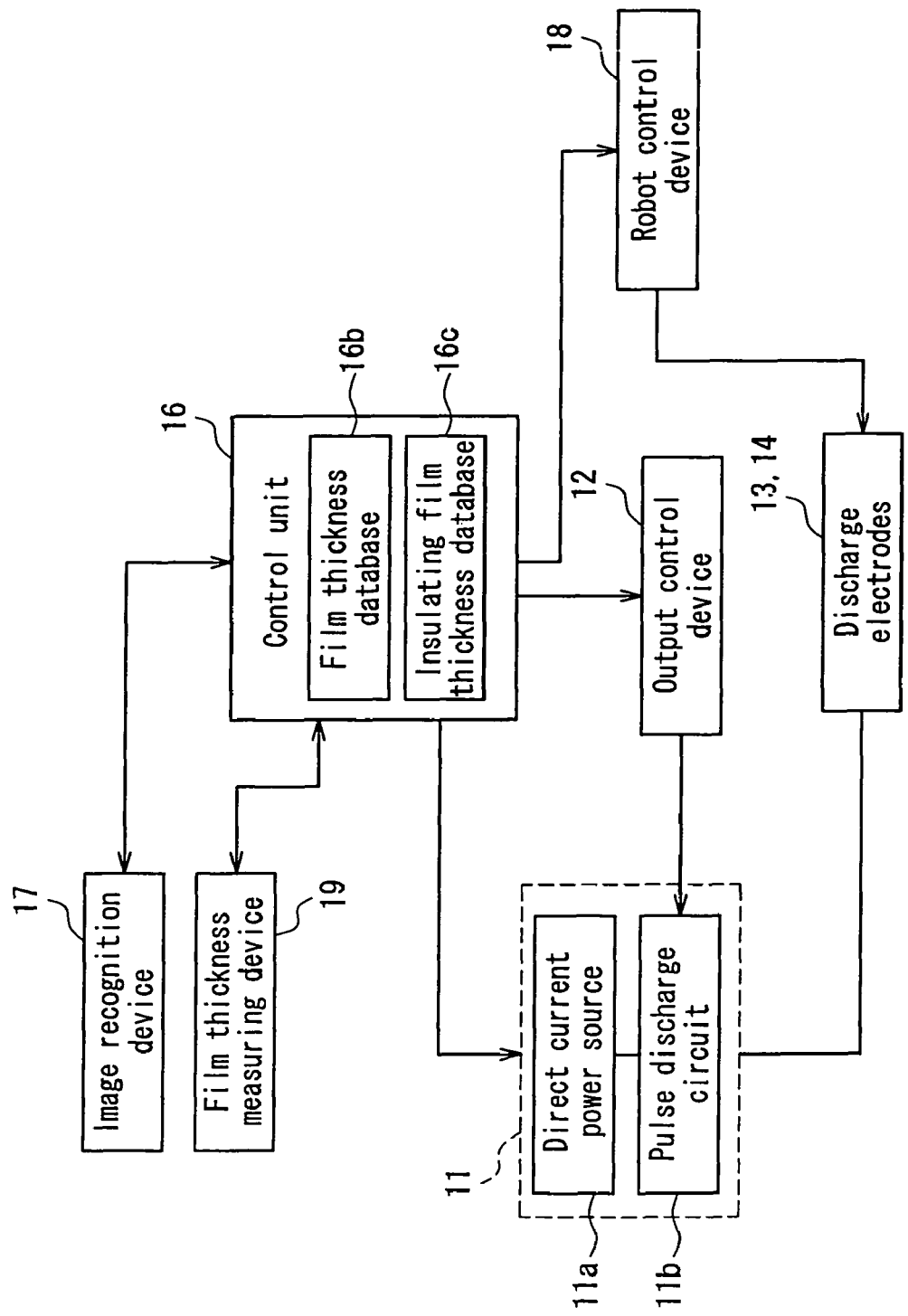
FIG. 21 is a block diagram showing the configuration of the metal coating removing apparatus according to Embodiment 4 of the present invention.
Figure 22:
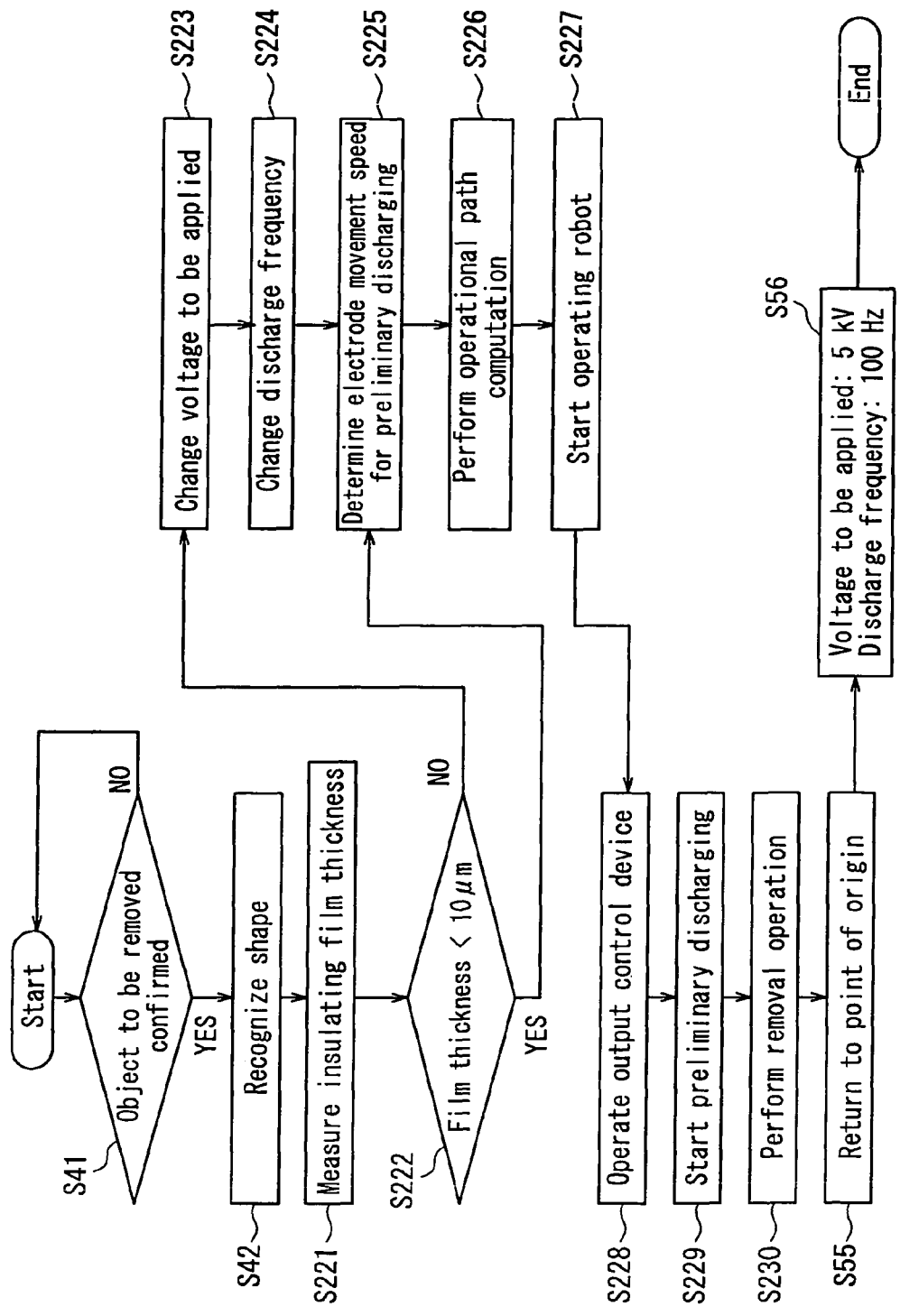
FIG. 22 is a flow chart showing an operation of the metal coating removing apparatus according to Embodiment 4 of the present invention.

Hereinafter, an exemplary processing operation of the metal coating removing apparatus 4 will be described specifically with reference to FIGS. 21 and 22. FIG. 21 is a block diagram of the metal coating removing apparatus 4, and FIG. 22 is a flow chart showing the operation of the metal coating removing apparatus 4. The following description is directed to the case where an object to be removed is the metal coating 101 with an insulating film provided on its surface.

When an image recognition device 17 confirms the object to be removed, a control unit 16 recognizes the shape of the object to be removed, which is performed in the same manner as for the metal coating removing apparatuses 1 to 3 in Embodiments 1 to 3 (S41 and S42). However, the metal coating removing apparatus 4 then generates plasma between the first electrode 13 and the second electrode 14, which is a difference from the metal coating removing apparatuses 1 to 3.

The metal coating removing apparatus 4 lowers, for example, a probe (not shown) for measuring a film thickness provided in a film thickness measuring device 19 by using a motor or the like, for example, so as to measure the thickness of the insulating film provided on the surface of the metal coating 101 (S221). Then, based on the result of measuring the film thickness, it is determined whether or not an initialized voltage to be applied and an initialized discharge frequency are appropriate with respect to the film thickness of the insulating film. In the present embodiment, the initial value of the voltage to be applied is 5 kV, and the initial value of the discharge frequency is 100 Hz. Thus, if the film thickness is smaller than 10 μm, for example, as a result of the measurement, it is judged that the removal can be performed at the initial values. If the film thickness is 10 μm or larger, it is judged that changes of the initial values are necessary (S222). If it is judged in S222 that changes of the initial values are unnecessary, a direct current power source 11a is switched on. If it is judged in S222 that changes of the initial values are necessary, the control unit 16 compares the information on the measured film thickness with data in an insulating film thickness database 16c, and changes the initialized voltage to be applied and the initialized discharge frequency into ones suitable for the film thickness of the insulating film (S223 and S224). According to this processing, an appropriate voltage to be applied and an appropriate discharge frequency during preliminary discharging can be set in accordance with the film thickness of the insulating film, and therefore a necessary plasma state can be created so as to remove the object to be removed stably even when the insulating film has a large film thickness.

After the voltage to be applied and the discharge frequency are judged as being appropriate in S222 or after the values of the voltage to be applied and the discharge frequency are changed appropriately in S223 and S224, respectively, the control unit 16 determines the electrode movement speed for preliminary discharging based on the conditions such as the voltage to be applied, the discharge frequency, the distance between the electrodes, and the like, and issues the instruction to a robot control device 18 (S225). Further, the control unit 16 performs an operation to obtain an operational method suitable for the shape of the object to be removed, and issues the instruction to the robot control device 18 (S226).

The robot control device 18 is operated so as to move the first electrode 13 and the second electrode 14 to the position of the conductive plate 41 (S227). Then, the output control device 12 is operated to issue an instruction concerning the voltage to be applied and the discharge frequency to the pulse power generator 11, thereby preparing for preliminary discharging. The pulse power generator 11 starts preliminary discharging based on the data from the output control device 12 (S228 and S229).

When preliminary discharging is completed, a removal operation is started (S230). The removal operation is performed in the same manner as in S101 to S104 and S50 to S54 of the metal coating removing apparatus 2 described in Embodiment 2, and thus a description thereof will be omitted here.

When the removal operation is completed, the electrodes 13 and 14 are returned to their points of origin (S55), the voltage to be applied and the discharge frequency of the output control device 12 are set to their initial values (voltage to be applied: 5 kV, discharge frequency: 100 Hz) (S56), and the metal coating removal operation is finished.

Figure 23A:
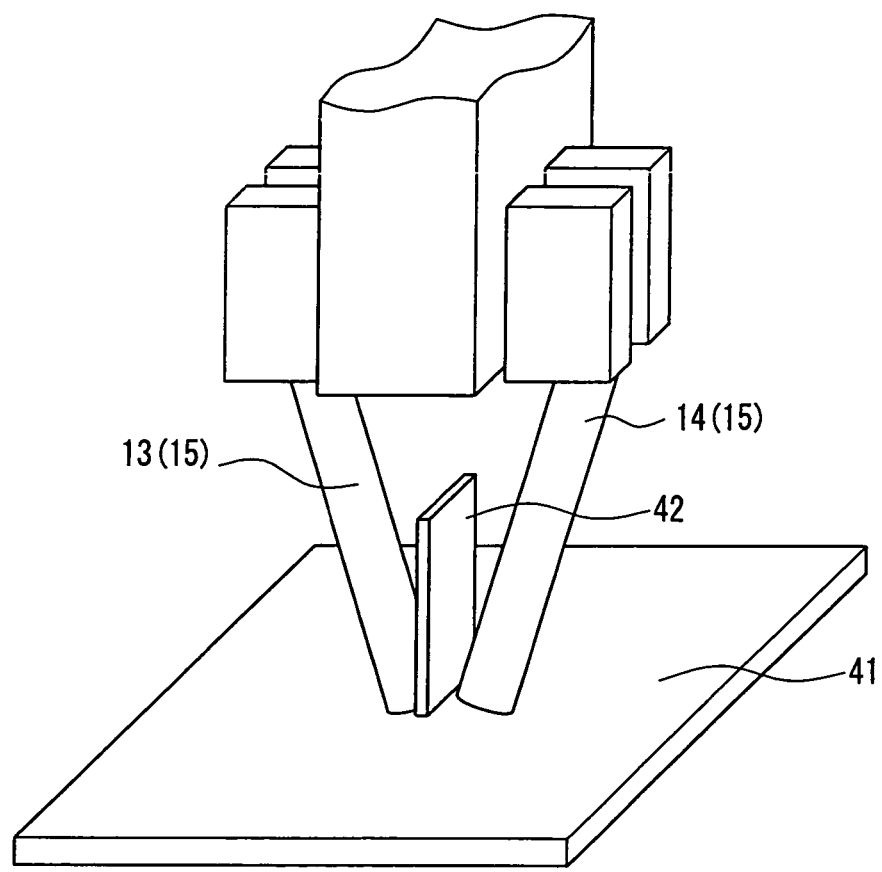
FIG. 23A is a perspective view showing another example of the electrode portion when preliminary discharging is performed by the metal coating removing apparatus shown in FIG. 19.
Figure 23B:
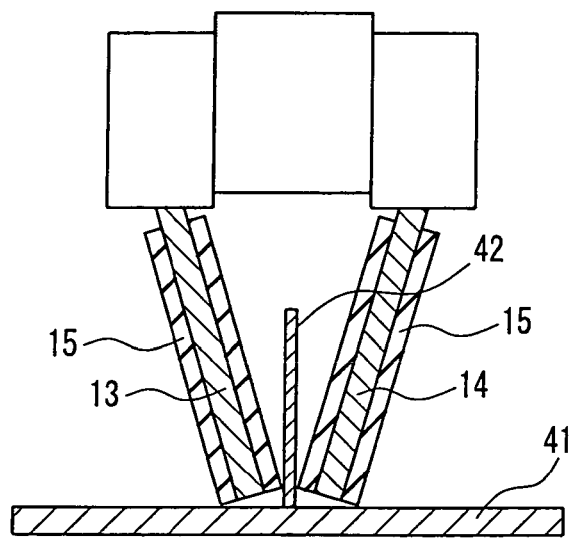
FIG. 23B is a side view corresponding to FIG. 23A, which includes a cross section of the electrode portion.

As described above, by performing preliminary discharging on top of the conductive plate 41, it becomes easy to create and maintain a thermal plasma state. Further, as shown in FIGS. 23A and 23B, when preliminary discharging is performed in a state where a conductive plate 42 is sandwiched between the first electrode 13 and the second electrode 14, thermal plasma can be generated more easily. FIG. 23A is a perspective view of the electrodes during preliminary discharging, and FIG. 23B is a partially cross-sectional side view corresponding to FIG. 23A. In FIGS. 23A and 23B, preliminary discharging is performed on top of the conductive plate 41 in the state where the conductive plate 42 is sandwiched between the electrodes. However, preliminary discharging also can be performed in the state where the conductive plate 42 is sandwiched between the electrodes instead of performing preliminary discharging on top of the conductive plate 41.

Figure 24:
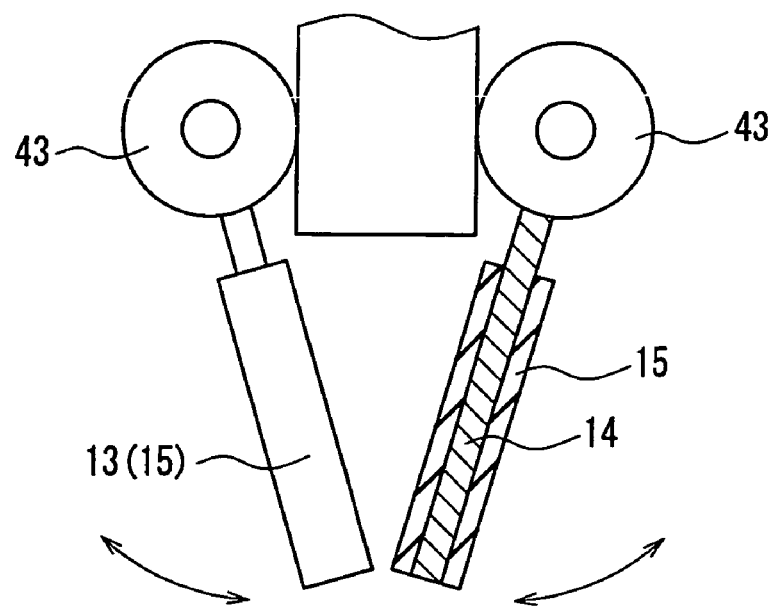
FIG. 24 is a partially cross-sectional schematic view showing another exemplary configuration of electrodes.

When the first electrode 13 and the second electrode 14 are provided so that a distance between the electrodes and an angle of the electrodes are variable as in the metal coating removing apparatus 3 described in Embodiment 3, by driving an electrode angle adjusting motor 43 that can adjust the angle of the electrodes by a rotational movement, for example, as shown in FIG. 24, the distance between the first electrode 13 and the second electrode 14 can be made small during preliminary discharging so that plasma develops easily, while the distance between the first electrode 13 and the second electrode 14 can be made large during the removal operation so as to obtain a large removal area. In the case where the distance between the electrodes and the angle of the electrodes are variable, the distance between the electrodes and the angle of the electrodes during the coating removal operation may be changed in accordance with the object to be removed as in the metal coating removing apparatus 3 described in Embodiment 3.

Figure 25:
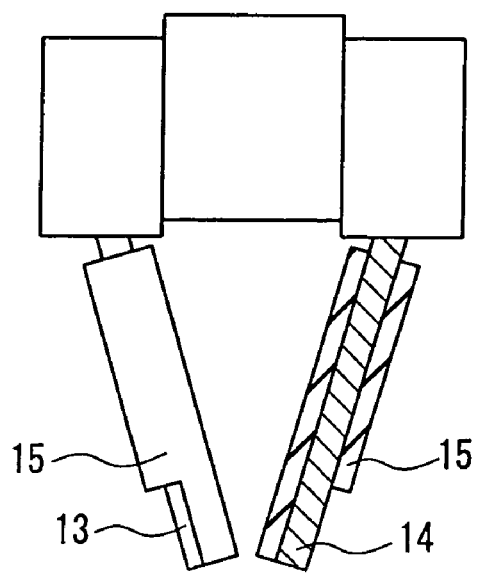
FIG. 25 is a partially cross-sectional schematic view showing another exemplary configuration of the electrodes.
Figure 26A:
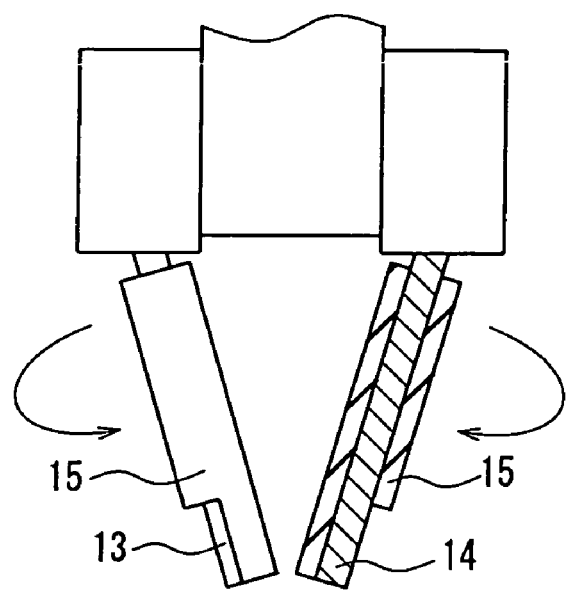
FIGS. 26A and 26B are partially cross-sectional schematic views of the electrodes having the configuration shown in FIG. 25, FIG. 26A showing a state of the electrodes during a removal operation and FIG. 26B showing a state of the electrodes during preliminary discharging.
Figure 26B:
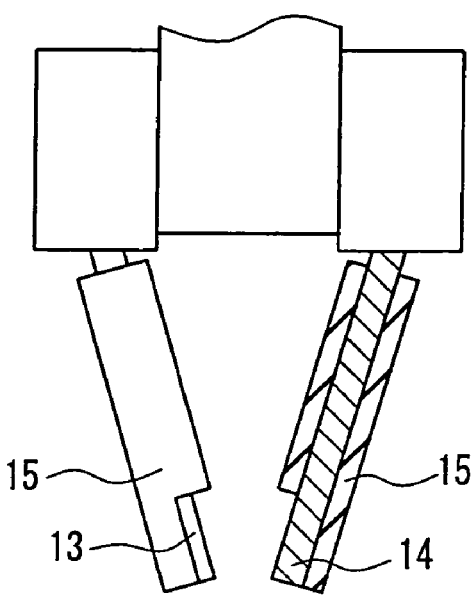

Further, as shown in FIG. 25, an insulating cover 15 may be provided so that a part of a front end portion of each of the first electrode 13 and the second electrode 14 is exposed. In such a case, preferably, the first electrode 13 and the second electrode 14 are provided rotatably so that portions to be opposed to each other are variable. By providing the first and second electrodes 13 and 14 rotatably, the first electrode 13 and the second electrode 14 can be rotated so that portions covered with the insulating covers 5 are opposed to each other as shown in FIG. 26A during the removal operation, while exposed portions are opposed to each other as shown in FIG. 26B during preliminary discharging. Consequently, the distance between the electrodes is made small during preliminary discharging, so as to generate plasma easily. During the removal operation, the distance between the electrodes is made large due to the existence of the insulating covers 15, resulting in a larger removal area.

In the present embodiment, preliminary discharging is performed on the conductive plate. However, this is not necessarily required. Preliminary discharging may be performed under the condition that allows thermal plasma to be generated by adjusting the distance between the electrodes or the like.

Embodiment 5

Figure 27:
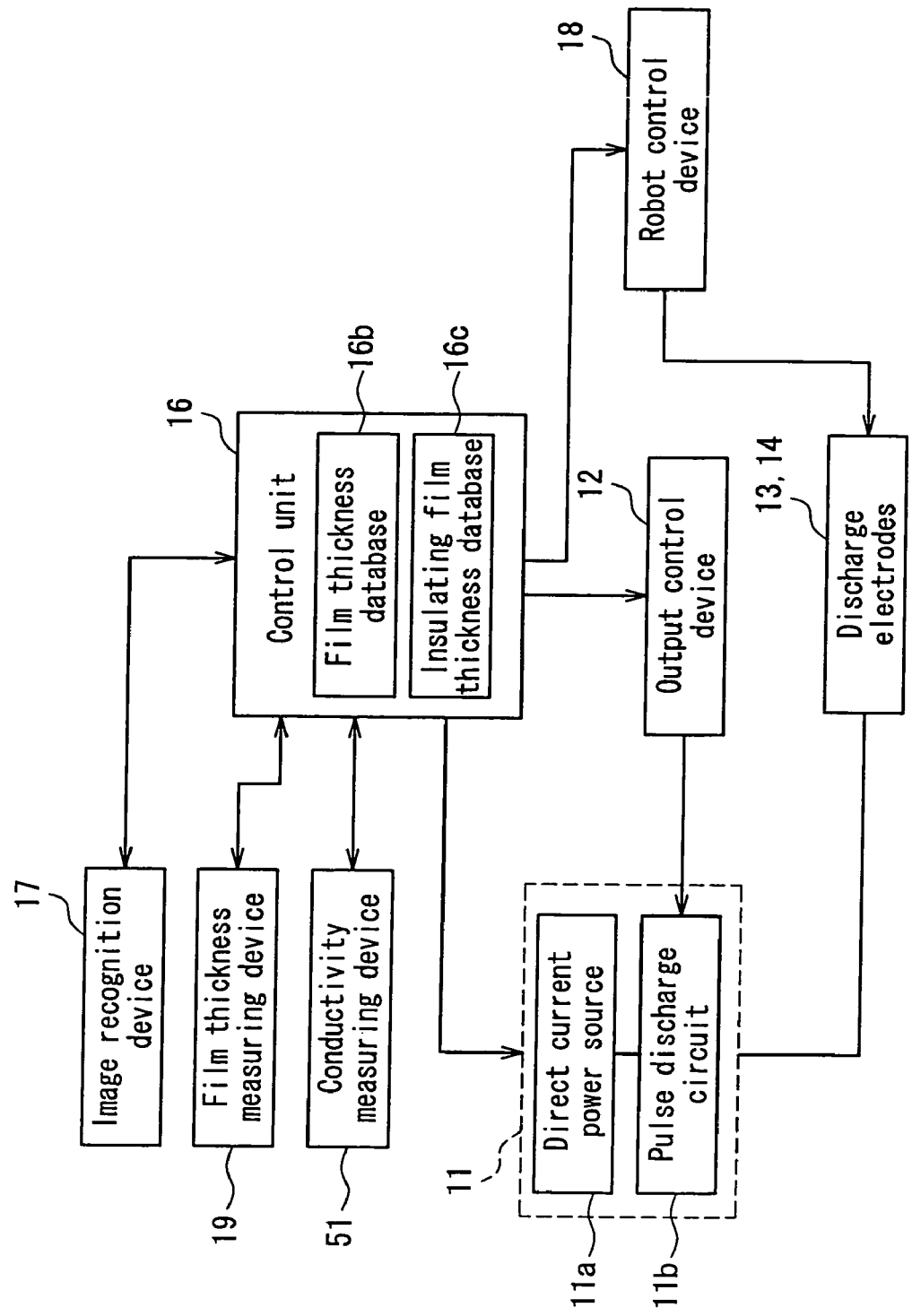
FIG. 27 is a block diagram showing a configuration of a metal coating removing apparatus according to Embodiment 5 of the present invention.
Figure 28:
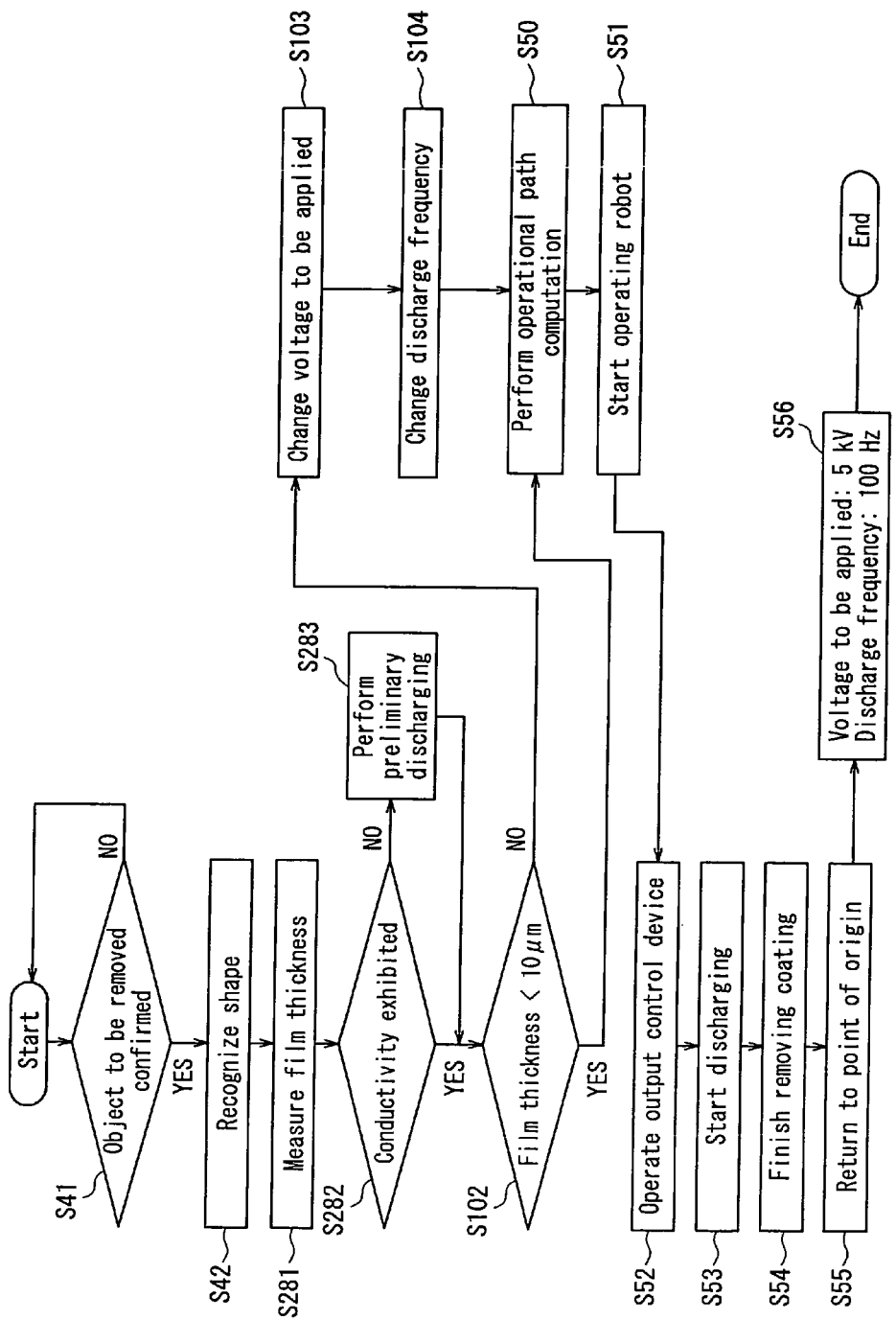
FIG. 28 is a flow chart showing an operation of the metal coating removing apparatus according to Embodiment 5 of the present invention.

Another embodiment of an apparatus and a method for removing a metal coating according to the present invention will be described with reference to FIGS. 27 and 28.

The metal coating removing apparatus of the present embodiment has the same configuration as that of the metal coating removing apparatus 4 (see FIG. 19) described in Embodiment 4 except that a conductivity measuring device is connected with a probe, for example, for measuring a film thickness provided in a film thickness measuring device 19, so as to measure the conductivity on a surface of an object to be removed. The components common to those of the metal coating removing apparatuses 1 to 4 described in Embodiment 1 to 4 are denoted with the same reference numerals, and detailed descriptions thereof will be omitted here.

As in Embodiment 4, the metal coating removing apparatus of the present embodiment also has a configuration for allowing preliminary discharging to occur between a first electrode 13 and a second electrode 14, thereby generating plasma. However, the metal coating removing apparatus of the present embodiment has the configuration for measuring the conductivity on the surface of the object to be removed, which makes it possible to determine the necessity of preliminary discharging in accordance with the state of the surface of the object to be removed. Thus, this metal coating removing apparatus also can be applied effectively to an object to be removed on a surface of which a conductive portion (metal film) and an insulating portion are mixed, such as a printed board, for example. In the case of an object to be removed on which minute metal films are provided partially, such as a printed board, it is difficult to make the first electrode 13 and the second electrode 14 opposed to the same metal film, which results in the necessity of applying a high voltage. Further, on a printed board, metal films often are provided at lower positions than the position of an insulating portion, and thus it is impossible to move the electrodes 13 and 14 while the electrodes 13 and 14 are in contact with the metal films. Accordingly, for continuous discharging, a gap is required between the metal films and the electrodes 13 and 14. For these reasons, the removal efficiency is reduced. To solve these problems, in the case of an object to be removed on a surface of which a conductive portion and an insulating portion are mixed, as in the present embodiment, the conductivity on the surface is measured so as to determine the necessity of preliminary discharging, and if determined necessary, preliminary discharging is performed followed by a removal operation. Consequently, discharging can be performed while a necessary gap is maintained and without increasing a voltage, resulting in an increase in removal efficiency.

Hereinafter, an exemplary processing operation of the metal coating removing apparatus of the present embodiment will be described specifically with reference to FIGS. 27 and 28. FIG. 27 is a block diagram of the metal coating removing apparatus of the present embodiment, and FIG. 28 is a flow chart showing the operation of this metal coating removing apparatus. The following description is directed to the case of an object to be removed on a surface of which a conductive portion and an insulating portion are mixed.

When an image recognition device 17 confirms the object to be removed, a control unit 16 recognizes the shape of the object to be removed, which is performed in the same manner as for the metal coating removing apparatuses 1 to 4 in Embodiments 1 to 4 (S41 and S42). However, according to the present configuration, the necessity of preliminary discharging is determined next, and if determined necessary, preliminary discharging is performed.

Initially, the metal coating removing apparatus lowers, for example, a probe (not shown) for measuring a film thickness connected with the film thickness measuring device 19 and a conductivity measuring device 51 by using a motor or the like, for example, so as to measure the conductivity on a surface layer of the object to be removed and the film thickness thereof (S281). Then, the necessity of preliminary discharging is determined based on whether the conductivity is exhibited or not (S282). If preliminary discharging is determined to be necessary, preliminary discharging is performed (S283). Preliminary discharging is performed in S283 in the same manner as that described in Embodiment 4, and a detailed description thereof will be omitted here.

After preliminary discharging or after the determination that preliminary discharging is unnecessary, a removal operation is performed. The removal operation is performed in the same manner as in S102 to S104 of the metal coating removing apparatus 2 described in Embodiment 2 and in S50 to S56 of the metal coating removing apparatus 1 described in Embodiment 1, and a description thereof will be omitted here.

In the present embodiment, the same electrode configuration as that in Embodiment 4 also may be used to perform preliminary discharging and the removal operation.

Embodiment 6

In the present embodiment, other examples of the first electrode 13 and the second electrode 14 in the metal coating removing apparatus described in each of Embodiments 1 to 5 will be described with reference to FIGS. 29 to 31.

Figure 29:
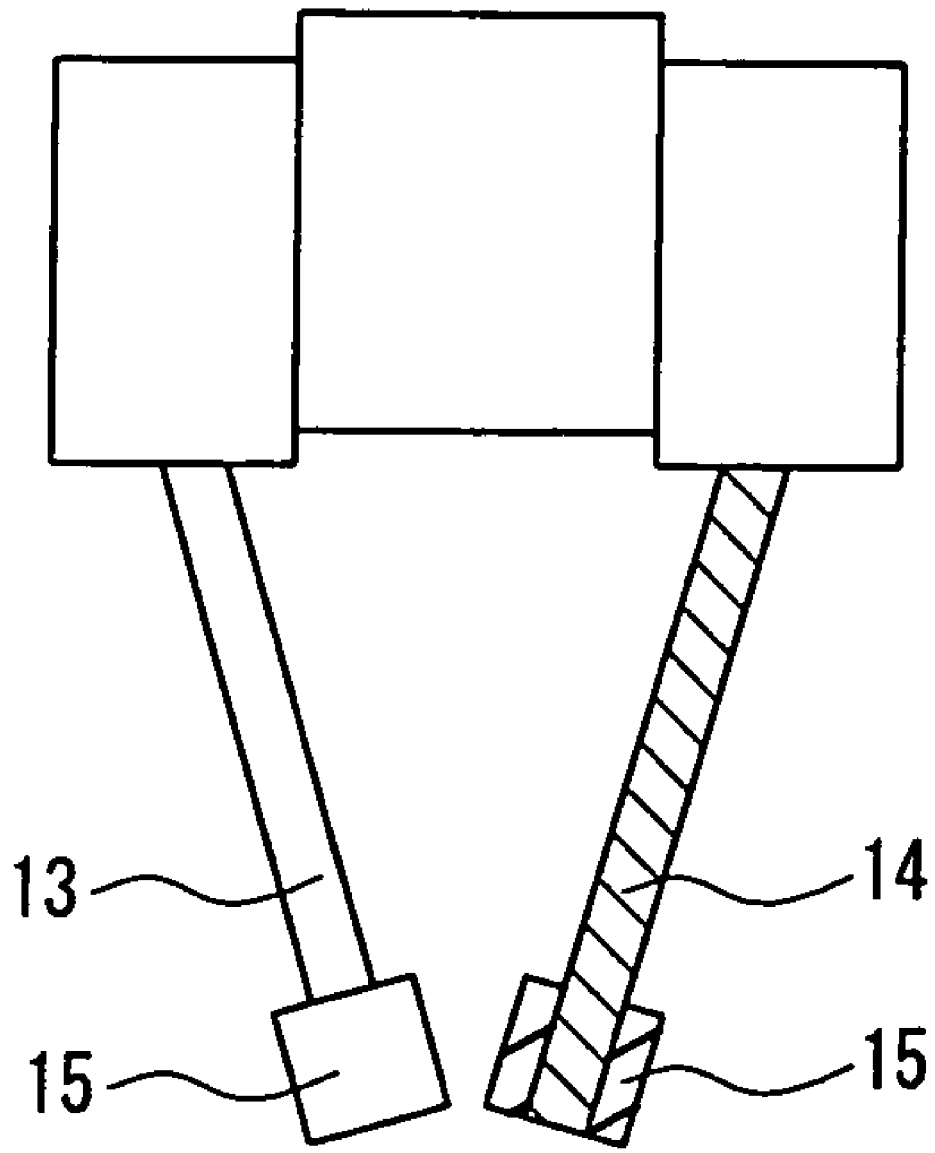
FIG. 29 is a partially cross-sectional schematic view showing an exemplary configuration of electrodes according to Embodiment 6 of the present invention.
Figure 30A:
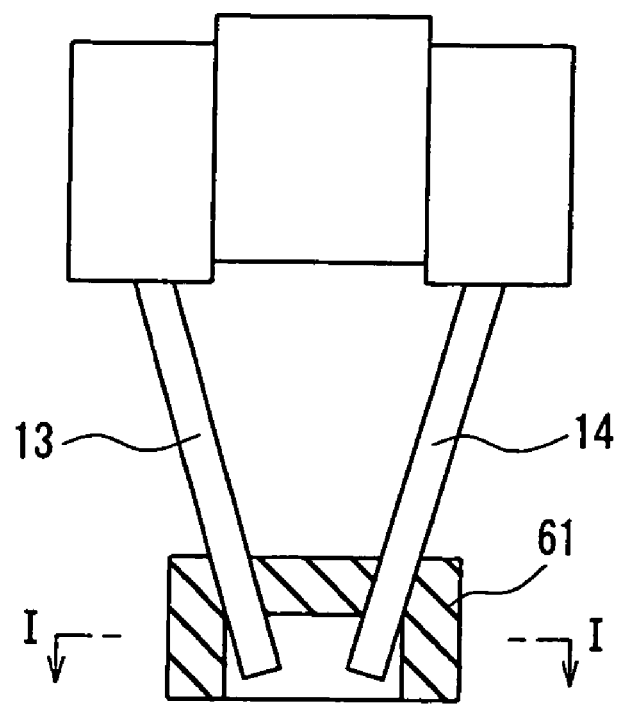
FIG. 30A is a partially cross-sectional schematic view showing another exemplary configuration of the electrodes according to Embodiment 6 of the present invention.
Figure 30B:
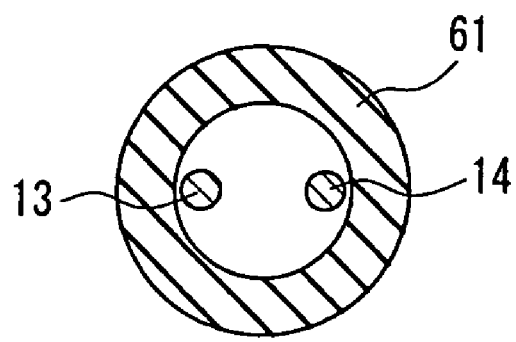
FIG. 30B is a cross-sectional view taken along a line I-I in FIG. 30A.

As shown in FIG. 29, an insulating cover 15 for each of the first electrode 13 and the second electrode 14 may be provided only at a front end portion thereof. Further, as shown in FIG. 30A, instead of the insulating covers 15, an insulating cap 61 may be provided so as to cover the front end portions of the first electrode 13 and the second electrode 14. FIG. 30B is a cross sectional view taken along a line I-I in FIG. 30A. When the first electrode 13 and the second electrode 14 are opposed to an object to be removed, the insulating cap 61 can cover a part of the object to be removed opposed to the first electrode 13 and the second electrode 14, resulting in an increase in removal efficiency.

Figure 31A:
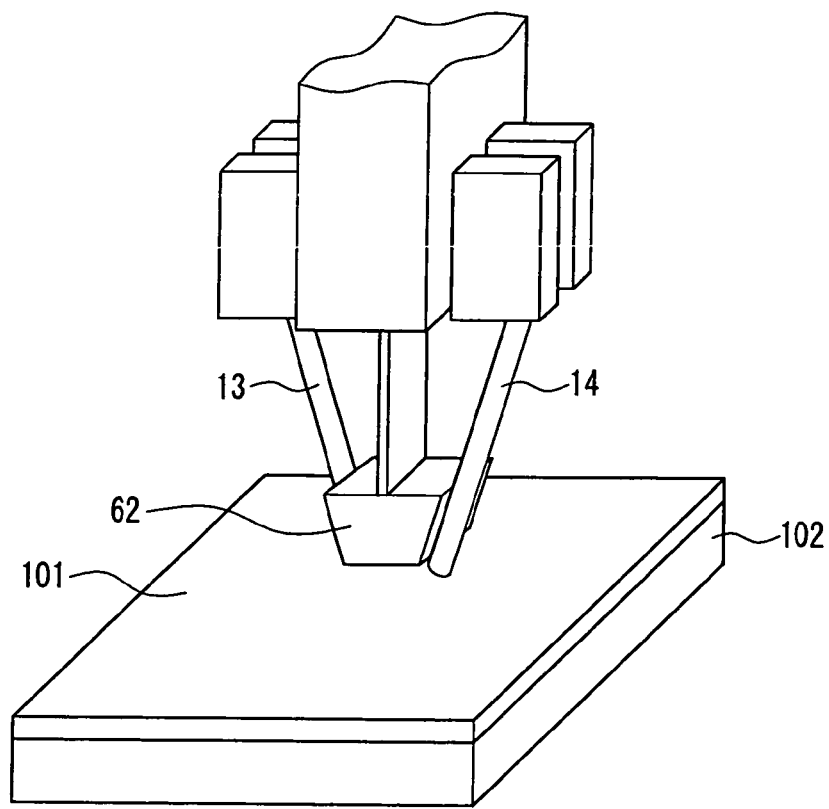
FIG. 31A is a perspective view showing still another exemplary configuration of the electrodes according to Embodiment 6 of the present invention.
Figure 31B:
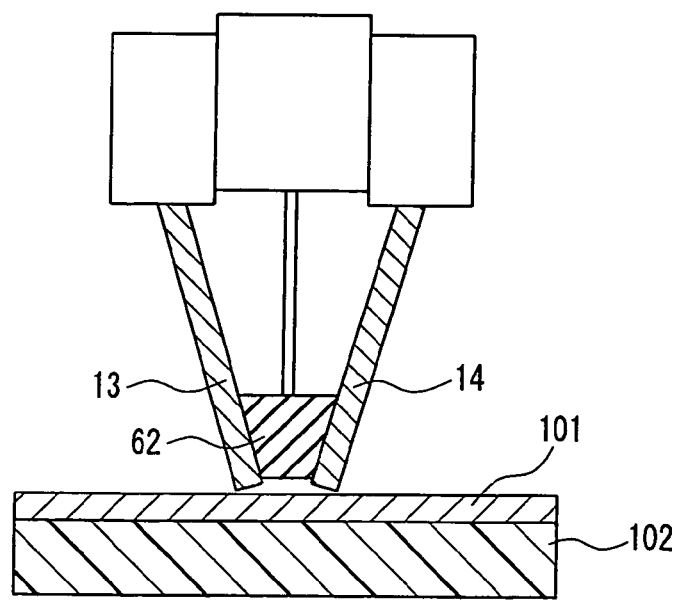
FIG. 31B is a side view corresponding to FIG. 31A, which includes a cross section of an electrode portion.

As shown in FIGS. 31A and 31B, an insulating member 62 may be provided between the first electrode 13 and the second electrode 14, and discharging is performed so as to remove a metal coating 101. With this configuration, the insulating member 62 limits (narrows) a discharge space, and therefore the metal coating 101 can be removed efficiently. FIG. 31A is a perspective view of the electrodes during a removal operation, and FIG. 31B is a partially cross-sectional side view corresponding to FIG. 31A.

The apparatus and the method for removing a metal coating according to the present invention will be described more specifically by way of examples.

EXAMPLE 1

Figure 32:
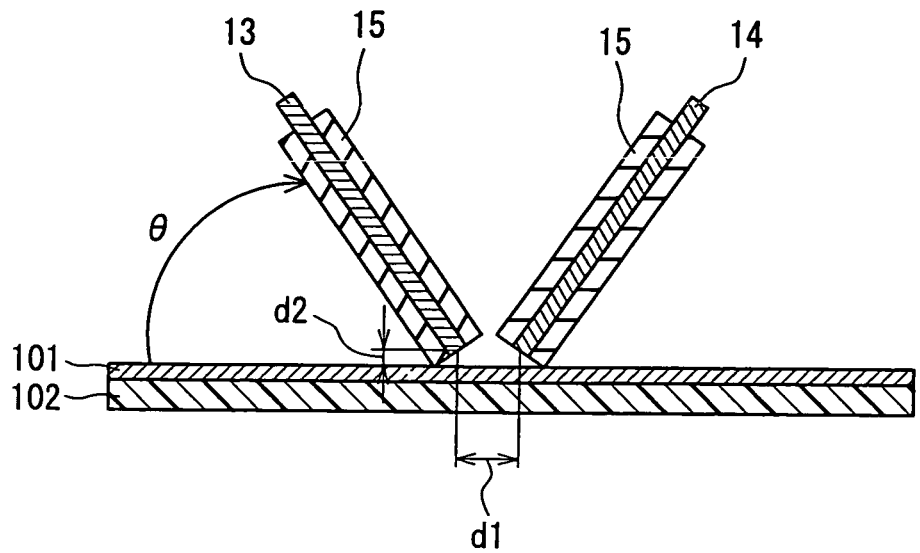
FIG. 32 is a view for explaining an arrangement of electrodes according to examples of the present invention.

In Example 1, a sample 1-$a$ of a metal coating removing apparatus was created so that the first electrode 13 and the second electrode 14, each being provided with the insulating cover 15, were positioned with respect to the metal coating 101 as shown in FIG. 32. The first electrode 13 and the second electrode 14 were formed of tungsten and had a rod shape (diameter: 0.5 mm). The insulating cover 15 was formed of aluminum oxide and had a tube shape with an outer diameter of 2.0 mm and an inner diameter of 1.0 mm so as to cover each of the electrodes 13 and 14. An electrode-to-electrode distance d1 was 4 mm, an electrode-to-object to be removed distance d2 was 0.2 mm, and an angle θ of the electrodes with respect to the object to be removed was 45 degrees. The direct current power source of the pulse power generator 11 had a voltage of 15 kV, and the capacitor had a capacity of 400 nF. Further, a sample 1-$b$ also was created that has the same configuration as that of the sample 1-$a$ except that the insulating cover 15 was not provided.

Figure 33:
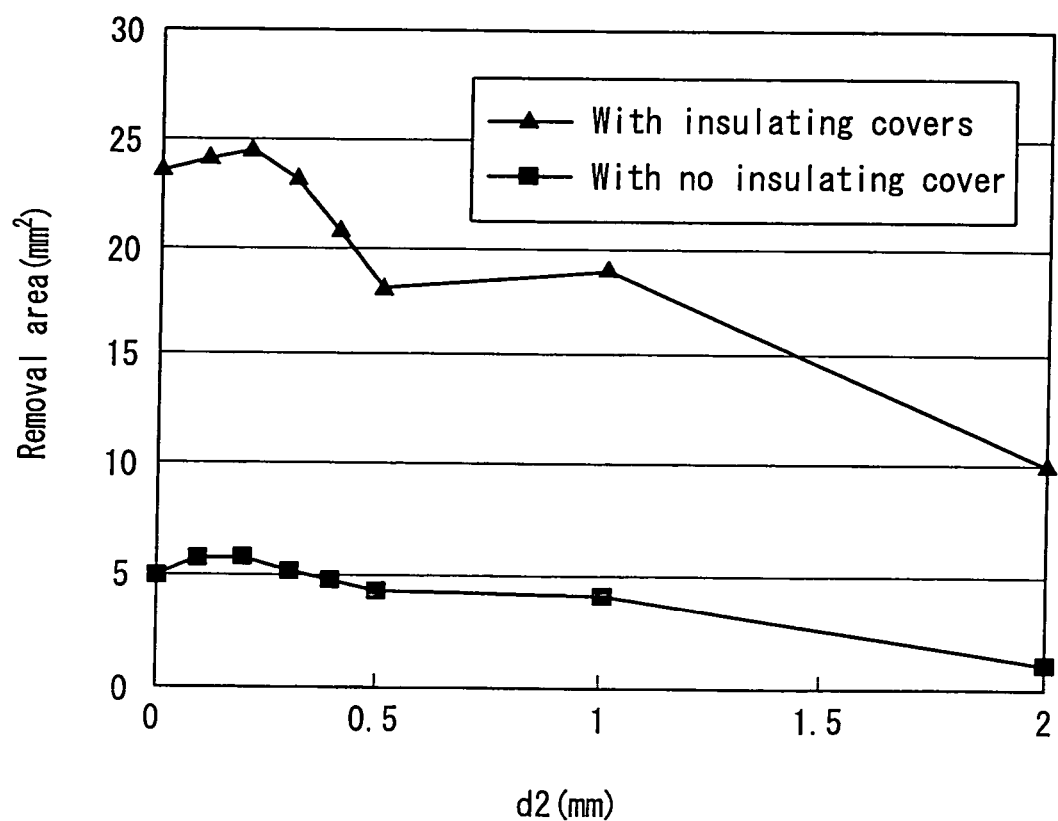
FIG. 33 is a graph showing the relationship between an electrode-to-object to be removed distance and a removal area in the case where an insulating cover is provided and in the case where an insulating cover is not provided.

By using the samples 1-$a$ and 1-$b$ thus created, the metal coating 101 provided on a surface of the resin 102 was removed. An ABS (acylonitrile-butadiene-styrene) resin plate (thickness: 2 mm) was used as the resin 102, and a nickel-chromium plating film having a thickness of 30 μm and a base metal of copper was used as the metal coating 101. FIG. 33 shows the removal area per 1 pulse in each of the case where the metal coating 101 was removed by using the sample 1-$a$ (with the insulating covers) and the case where the metal coating 101 was removed by using the sample 1-$b$ (with no insulating cover). From these results, it was confirmed that the electrodes covered with the insulating covers allowed a larger removal area to be obtained with an identical applied voltage.

EXAMPLE 2

In Example 2, samples of the metal coating removing apparatus (sample 1-$a$ with the insulating covers) created in Example 1 were created so that an electrode-to-electrode distance d1, an electrode-to-object to be removed distance d2, and a direct current voltage (applied voltage) were varied. The electrode-to-electrode distance d1 was 3 mm, 4 mm, 5 mm, or 6 mm. The electrode-to-object to be removed distance d2 was 0 mm, 0.1 mm, 0.5 mm, 1.0 mm, or 2.0 mm. The direct current power source was 5 kV, 10 kV, or 15 kV. The removal by each of the samples was evaluated as shown in Table 2. In Table 2, the evaluation of the removal is expressed as follows: by using ⊚ (d1: 4 mm, d2: 0.1 mm, applied voltage: 5 kV) as the reference (removal area: 100%), ○ represents that a removal area of almost 100% (about 80% to 100%) was obtained, Δ represents that a removal area of about 80% or lower was obtained, ▲ represents that a removal area of 40% or lower was obtained, and x represents that discharging hardly occurred.

TABLE 2

| Electrode-to-object to be removed distance d2 | Applied voltage | Electrode-to-electrode distance d1 | | | |
|---|---|---|---|---|---|
| | | 3 mm | 4 mm | 5 mm | 6 mm |
| 0 mm | 5 kV | ▲ | ▲ | ▲ | ▲ |
| | 10 kV | Δ | Δ | Δ | Δ |
| | 15 kV | ○ | ○ | ○ | ○ |
| 0.1 mm | 5 kV | ▲ | ▲ | ▲ | ▲ |
| | 10 kV | Δ | Δ | Δ | Δ |
| | 15 kV | ○ | ⊚ | ○ | ○ |
| 0.5 mm | 5 kV | ▲ | ▲ | ▲ | ▲ |
| | 10 kV | Δ | Δ | Δ | Δ |
| | 15 kV | Δ | Δ | Δ | Δ |
| 1.0 mm | 5 kV | ▲ | ▲ | ▲ | ▲ |
| | 10 kV | Δ | Δ | Δ | Δ |
| | 15 kV | Δ | Δ | Δ | Δ |
| 2.0 mm | 5 kV | X | X | X | X |
| | 10 kV | ▲ | ▲ | Δ | Δ |
| | 15 kV | ▲ | ▲ | Δ | Δ |

According to the results shown in Table 2, when the electrode-to-object to be removed distance d2 was 1.0 mm or lower, the result was ▲ when the direct current power source had a voltage of 5 kV, and was Δ when the direct current power source had a voltage of 10 kV, with respect to an electrode-to-electrode distance d1 of 3 to 6 mm. Further, when the voltage was 15 kV, the result was ○ with respect to an electrode-to-object to be removed distance d2 of 0 mm and 0.1 mm, and was Δ with respect to an electrode-to-object to be removed distance d2 of 0.5 mm and 1.0 mm. When the electrode-to-object to be removed distance d2 was comparatively large (herein, 2.0 mm), relatively preferable results were obtained with respect to an electrode-to-electrode distance d1 of 5 mm or more. The reason for this is considered as follows: a large electrode-to-object to be removed distance d2 and a small electrode-to-electrode distance d1 allow a current to flow between the first electrode 13 and the second electrode 14, which makes it difficult to remove the metal coating 101, and therefore a certain distance is required between the electrodes. It was confirmed that the electrode-to-object to be removed distance d2 was preferably 1.0 mm or lower. However, when the electrode-to-object to be removed distance d2 was 0 mm, a surface of the resin 102 was burned. This proved that in order to recycle resins, preferably, discharging is performed without bringing the electrodes into contact with the metal coating 101 (by setting d2 to 0.1 mm or more).

EXAMPLE 3

Figure 34:
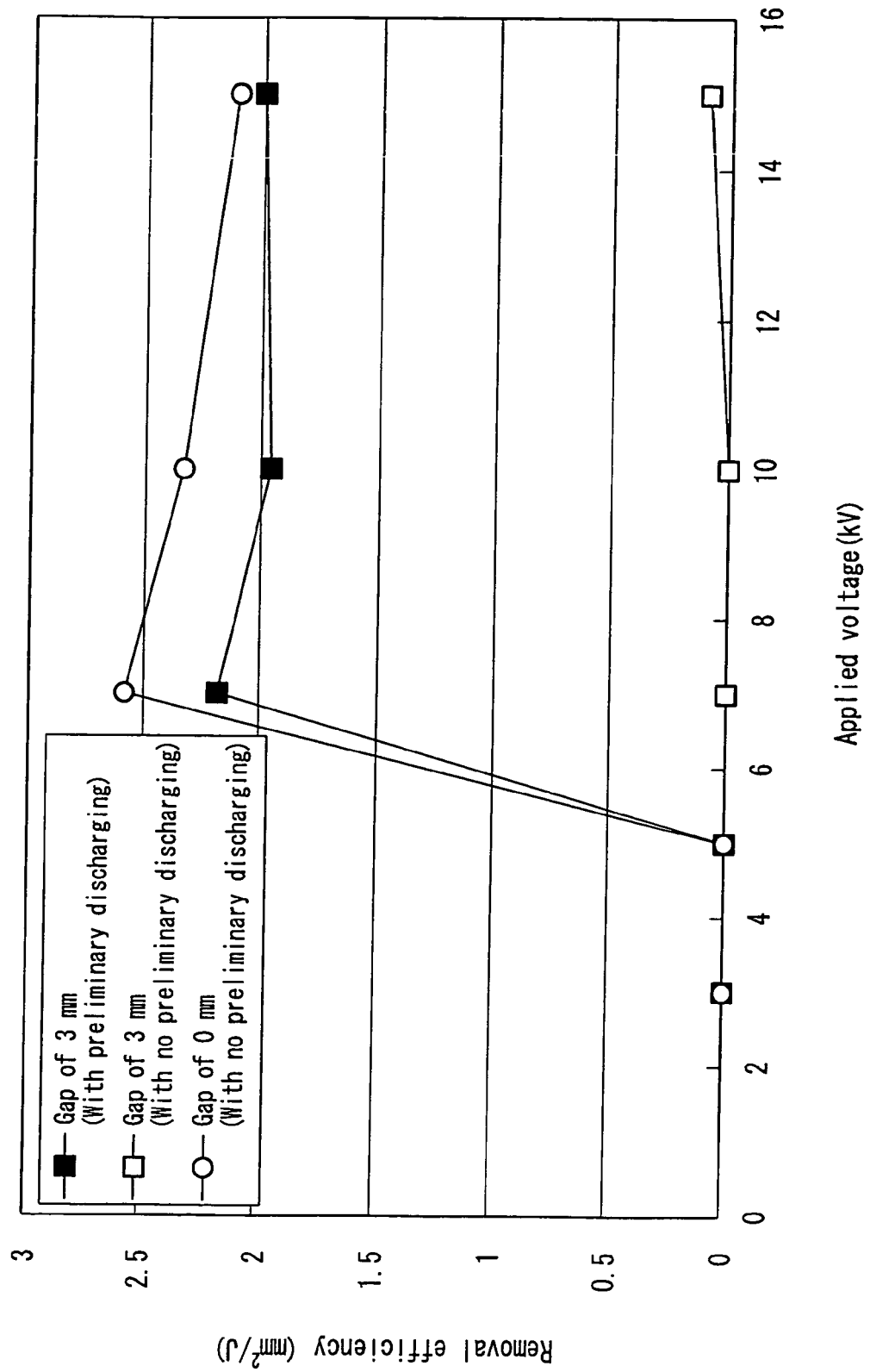
FIG. 34 is a graph showing the relationship between an applied voltage and the removal efficiency in the case where preliminary discharging is performed and in the case where preliminary discharging is not performed.

In Example 3, the metal coating 101 provided on a surface of the resin 102, the metal coating 101 being provided with an insulating film on its surface as a protective film, was removed by using the metal coating removing apparatus 4 described in Embodiment 4. An ABS resin plate (thickness: 1.2 mm) was used as the resin 102, an Al film having a thickness of 50 nm was used as the metal coating 101, and an ultraviolet curable resin film having a thickness of 20 µm was used as the insulating film. The first electrode 13 and the second electrode 14 were formed of the same material as in Example 1. With the metal coating removing apparatus 4 thus configured, the removal efficiency in the cases where an electrode-to-object to be removed distance (gap) was 3 mm and 0 mm, respectively, with respect to an electrode-to-electrode distance of 2 mm was obtained by changing the applied voltage. When a gap of 3 mm was provided, the removal efficiency in each of the cases where preliminary discharging was performed (plasma was generated between the electrodes) and where preliminary discharging was not performed was obtained. When a gap of 0 mm was provided, the removal efficiency only in the case where preliminary discharging was not performed was obtained. The removal efficiency was obtained by measuring a removal area per 1 joule. The applied voltage during preliminary discharging was the same as that used for the removal. The results are shown in FIG. 34. By performing preliminary discharging so as to generate plasma between the electrodes, even when a gap of 3 mm was provided, the removal efficiency was as high as that obtained when no gap was provided. In the case where a gap of 3 mm was provided and preliminary discharging was not performed, the removal area per 1 pulse was almost 0 mm² even by increasing the applied voltage.

According to the above results, it was confirmed that in the case of a metal coating with an insulating film provided on its surface, the removal efficiency was increased by removing the metal coating after generating plasma between the electrodes by preliminary discharging.

EXAMPLE 4

Figure 35:
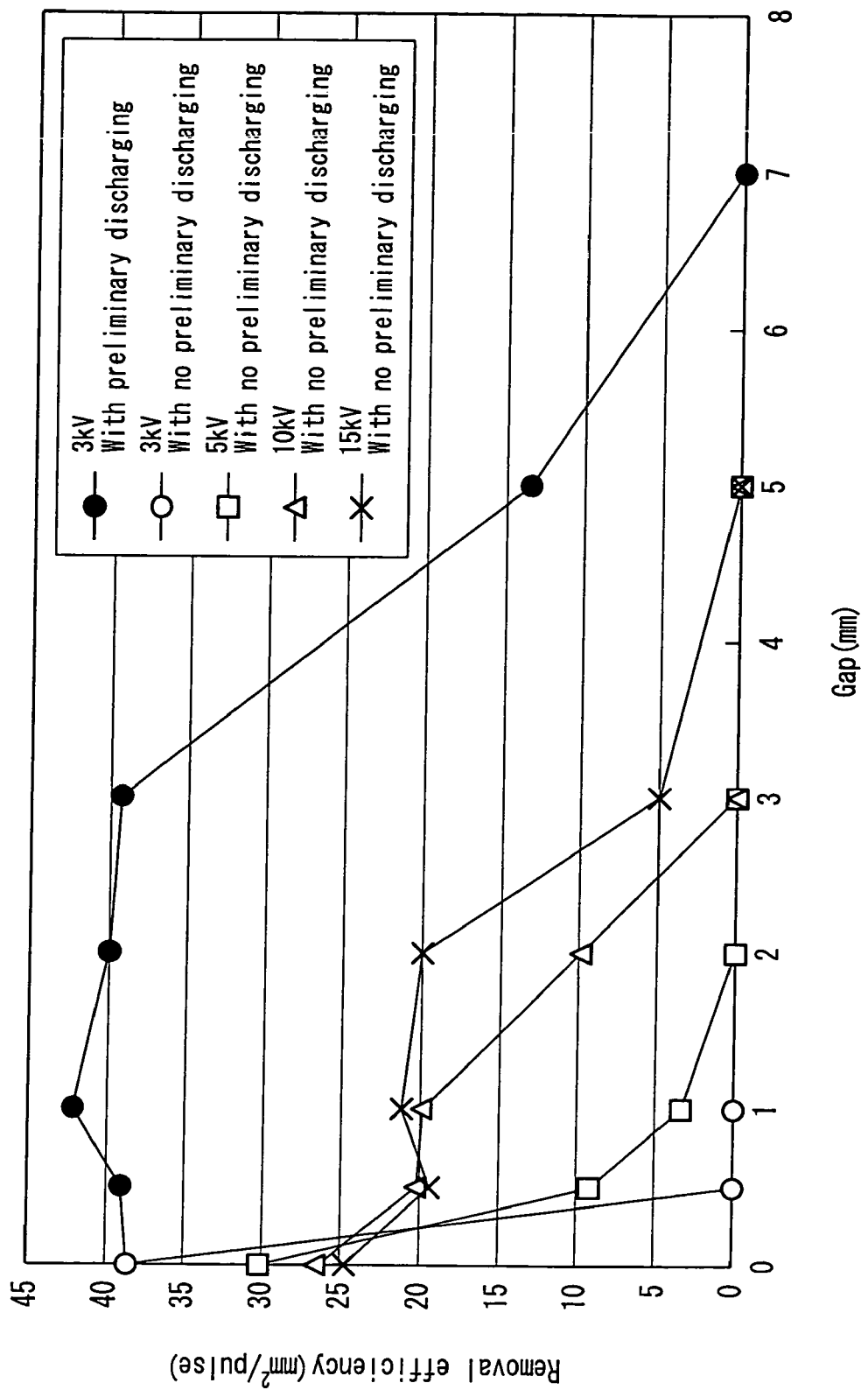
FIG. 35 is a graph showing the relationship between a gap and the removal efficiency in the case where preliminary discharging is performed and in the case where preliminary discharging is not performed.

In Example 4, the metal coating 101 provided on the resin 102 was removed by using the metal coating removing apparatus 4 described in Embodiment 4. In the present example, a laminate of a Cu film (20 µm), an Ni film (10 µm), and Cr (0.2 µm) that is provided on an ABS resin plate was used as an object to be removed. The removal efficiency with respect to an applied voltage of 3 kV, 5 kV, 10 kV, and 15 kV was obtained by changing an electrode-to-object to be removed distance (gap). The removal efficiency was obtained by measuring a removal area per 1 pulse. Only when the applied voltage was 3 kV, the removal efficiency in each of the cases where preliminary discharging was performed and where preliminary discharging was not performed was obtained. When the other voltages were applied, the removal efficiency only in the case where preliminary discharging was not performed was obtained. The applied voltage during preliminary discharging was 3 kV. The results are shown in FIG. 35. As can be seen from the results, when preliminary discharging was not performed, the removal efficiency decreased with an increase of the gap, which raised the need to increase the applied voltage. However, even when a high voltage was applied, the removal area per 1 pulse was small. On the other hand, when preliminary discharging was performed, the removal area per 1 pulse was large regardless of the size of the gap, which proved that the metal coating was removed efficiently.

Further, with respect to a printed board in which a laminated film of Cu (35 µm)/Ni (5 µm)/Cr (0.1 µm) was provided on a resin board as an insulating portion, a removal operation was performed after performing preliminary discharging. As a result, the insulating portion was removed more efficiently than in the case where preliminary discharging was not performed.

EXAMPLE 5

In Example 5, a thermal plasma generating state between the electrodes by preliminary discharging was obtained. A pulse discharge circuit of the pulse power generator 11 used herein included a primary side circuit and a secondary side circuit as shown in FIG. 5. In the present example, it was confirmed whether or not thermal plasma was generated between the electrodes by changing the output voltage of the secondary side circuit, the electrode material, and the discharge frequency. The results are shown in Table 3. As shown in Table 3, in each of the cases where tungsten, copper-tungsten, silver-tungsten, and copper were used as the electrode material, it was confirmed that thermal plasma was generated by selecting the output voltage of the secondary side circuit or the discharge frequency.

TABLE 3

| | Electrode material | Secondary side output voltage | Discharge frequency | Thermal plasma generating state |
|---|---|---|---|---|
| Ex. 1 | Tungsten | 3 kV | 2 Hz | ◯ |
| Ex. 2 | Tungsten | 3 kV | 6 Hz | ◯ |
| Ex. 3 | Tungsten | 3 kV | 20 Hz | ◯ |
| Ex. 4 | Tungsten | 3 kV | 50 Hz | ◯ |
| Ex. 5 | Copper-tungsten | 3 kV | 5 Hz | ◯ |
| Ex. 6 | Copper-tungsten | 3 kV | 2 Hz | X |
| Ex. 7 | Copper-tungsten | 3 kV | 3 Hz | ◯ |
| Ex. 8 | Copper-tungsten | 3 kV | 20 Hz | ◯ |
| Ex. 9 | Silver-tungsten | 3 kV | 1 Hz | X |
| Ex. 10 | Silver-tungsten | 3 kV | 3 Hz | ◯ |
| Ex. 11 | Silver-tungsten | 3 kV | 5 Hz | ◯ |
| Ex. 12 | Silver-tungsten | 3 kV | 50 Hz | ◯ |
| Ex. 13 | Copper | 3 kV | 5 Hz | ◯ |
| Ex. 14 | Copper | 3 kV | 1 Hz | X |
| Ex. 15 | Copper | 3 kV | 3 Hz | X |
| Ex. 16 | Copper | 3 kV | 50 Hz | ◯ |
| Ex. 17 | Tungsten | 15 kV | 3 Hz | X |
| Ex. 18 | Tungsten | 15 kV | 5 Hz | ◯ |
| Ex. 19 | Tungsten | 15 kV | 50 Hz | ◯ |
| Ex. 20 | Silver-tungsten | 15 kV | 5 Hz | X |
| Ex. 21 | Silver-tungsten | 15 kV | 6 Hz | ◯ |
| Ex. 22 | Silver-tungsten | 15 kV | 50 Hz | ◯ |
| Ex. 23 | Copper-tungsten | 15 kV | 3 Hz | X |
| Ex. 24 | Copper-tungsten | 15 kV | 5 Hz | X |
| Ex. 25 | Copper-tungsten | 15 kV | 6 Hz | ◯ |
| Ex. 26 | Copper-tungsten | 15 kV | 50 Hz | ◯ |

INDUSTRIAL APPLICABILITY

The apparatus and the method for removing a metal coating according to the present invention can be used to remove a metal coating provided on a surface of a resin, and particularly can be applied effectively to the removal of a metal coating with a view to recycling resins.

The invention claimed is:

1. A metal coating removing apparatus for removing a metal coating provided on a surface of a resin, comprising:
   a first electrode arranged so as to be opposed to the metal coating provided on the surface of the resin;
   a second electrode arranged so as to be opposed to the metal coating at a predetermined distance from the first electrode; and
   a discharge energy supply portion for supplying discharge energy between the first electrode and the second electrode so as to allow discharging to occur between the first electrode and the second electrode, thereby removing the metal coating,
   wherein at least one of the first electrode and the second electrode is covered with an insulating cover made of an insulating material except for at least a portion opposed to the metal coating provided on the surface of the resin, and
   the insulating cover and the at least one electrode covered with the insulating cover are provided so that relative positions of the insulating cover and the electrode are adjustable.

2. The metal coating removing apparatus according to claim 1, further comprising an insulating member arranged between the first electrode and the second electrode.

3. The metal coating removing apparatus according to claim 1, further comprising an insulating cap for covering at least front end portions of the first electrode and the second electrode.

4. The metal coating removing apparatus according to claim 1, wherein the insulating cover is provided so that one end of the insulating cover contacts with the object to be removed during a removal operation, and the at least one electrode covered with the insulating cover is provided so as to be kept from contact with the metal to be removed during the removal operation.

5. The metal coating removing apparatus according to claim 1, further comprising an output control portion for controlling the discharge energy supply portion,
   wherein the output control portion controls at least either one of an amount of the discharge energy and a discharge frequency supplied from the discharge energy supply portion.

6. The metal coating removing apparatus according to claim 1, further comprising an electrode-to-electrode distance control portion for controlling a distance between the first electrode and the second electrode.

7. The metal coating removing apparatus according to claim 1, further comprising an electrode-to object to be removed distance control portion for controlling a distance between the first electrode as well as the second electrode and the object to be removed.

8. The metal coating removing apparatus according to claim 1, further comprising an electrode angle control portion for controlling an angle of the first electrode and the second electrode with respect to the object to be removed in a range of 0 to 90 degrees.

9. The metal coating removing apparatus according to claim 1, further comprising an image recognition portion for recognizing a shape of the object to be removed.

10. The metal coating removing apparatus according to claim 1, further comprising a film thickness measurement portion for measuring a thickness of the object to be removed.

11. The metal coating removing apparatus according to claim 1, further comprising a metal recognition portion for recognizing a type of a metal of the object to be removed.

12. The metal coating removing apparatus according to claim 1, wherein a distance between the first electrode and the second electrode is not less than 1 mm and not more than 20 mm.

13. The metal coating removing apparatus according to claim 1, wherein a distance between the first electrode as well as the second electrode and the object to be removed is not less than 01. mm and not more than 3.0 mm.

14. The metal coating removing apparatus according to claim 1, wherein an angle of the first electrode and the second electrode with respect to the object to be removed is not less than 15 degrees and not more than 90 degrees.

15. The metal coating removing apparatus according to claim 1, further comprising a plasma generation portion for generating plasma between the first electrode and the second electrode.

16. The metal coating removing apparatus according to claim 15, wherein the plasma generation portion supplies discharge energy between the first electrode and the second electrode so as to allow discharging to occur between the first electrode and the second electrode, thereby generating plasma.

17. The metal coating removing apparatus according to claim 16, wherein the plasma generation portion allows discharging to occur between the first electrode and the second electrode in the vicinity of a conductive material, thereby generating plasma between the first electrode and the second electrode.

18. A metal coating removing method for removing a metal coating provided on a surface of a resin, comprising:
   arranging a first electrode and a second electrode so that they are opposed to the metal coating provided on the surface of the resin; and
   supplying discharge energy between the first electrode and the second electrode so as to allow discharging to occur between the first electrode and the second electrode, thereby removing the metal coating,
   at least one of the first electrode and the second electrode being covered with an insulating cover made of an insulating material except for at least a portion opposed to the metal coating provided on the surface of the resin, and
   the insulating cover and the at least one electrode covered with the insulating cover being provided so that relative positions of the insulating cover and the electrode are adjustable.

19. The metal coating removing method according to claim 18, comprising controlling at least either one of an amount of the discharge energy and a discharge frequency in accordance with at least either one of a thickness and a type of a metal of the object to be removed.

20. The metal coating removing method according to claim 18, comprising controlling a distance between the first electrode and the second electrode in accordance with at least either one of a thickness and a type of a metal of the object to be removed.

21. The metal coating removing method according to claim 18, comprising controlling a distance between the first electrode as well as the second electrode and the object to be removed in accordance with at least either one of a thickness and a type of a metal of the object to be removed.

22. The metal coating removing method according to claim 18, comprising controlling an angle of the first electrode and the second electrode with respect to the object to be removed in accordance with at least either one of a thickness and a type of a metal of the object to be removed.

23. The metal coating removing method according to claim 18, comprising:
    subjecting the object to be removed to test removal ahead of time;
    measuring a removal area obtained by the test removal; and
    controlling at least either one of an amount of the discharge energy and a discharge frequency in accordance with a result of measuring the removal area.

24. The metal coating removing method according to claim 18, comprising generating plasma between the first electrode and the second electrode before arranging the first electrode and the second electrode so that they are opposed to the metal coating provided on the surface of the resin.

25. The metal coating removing method according to claim 24, comprising supplying discharge energy between the first electrode and the second electrode so as to allow preliminary discharging to occur between the first electrode and the second electrode, thereby generating plasma between the first electrode and the second electrode, before arranging the first electrode and the second electrode so that they are opposed to the metal coating provided on the surface of the resin.

26. The metal coating removing method according to claim 25, wherein the preliminary discharging is performed in a state where the first electrode and the second electrode are arranged in the vicinity of a conductive material.

* * * * *